United States Patent
Suchezky et al.

(10) Patent No.: US 8,746,613 B2
(45) Date of Patent: Jun. 10, 2014

(54) JET ENGINE EXHAUST NOZZLE AND ASSOCIATED SYSTEM AND METHOD OF USE

(75) Inventors: Mark E. Suchezky, South Lyon, MI (US); Lisa M. Simpkins, Novi, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 1329 days.

(21) Appl. No.: 12/544,830

(22) Filed: Aug. 20, 2009

(65) Prior Publication Data

US 2010/0212288 A1    Aug. 26, 2010

Related U.S. Application Data

(60) Provisional application No. 61/090,597, filed on Aug. 20, 2008.

(51) Int. Cl.
    *B64C 15/00*    (2006.01)
(52) U.S. Cl.
    USPC .............................. 244/52; 244/53 R; 60/229
(58) Field of Classification Search
    USPC ................ 244/12.5, 12.4, 23 D, 53 R, 55, 5; 239/265.19; 60/39.01, 204, 233, 228, 60/230, 797
    See application file for complete search history.

(56) References Cited

U.S. PATENT DOCUMENTS

| | | |
|---|---|---|
| 3,495,682 A | 2/1970 | Treiber |
| 3,625,432 A | 12/1971 | Bragg |
| 3,666,211 A | 5/1972 | Cathers et al. |
| 3,677,501 A * | 7/1972 | Denning ........................ 244/12.5 |
| 3,920,203 A * | 11/1975 | Moorehead ..................... 244/207 |
| 3,964,568 A | 6/1976 | Neumann |
| 4,050,631 A * | 9/1977 | Syltebo ....................... 239/265.25 |
| 4,288,984 A | 9/1981 | Bhat et al. |
| 4,447,024 A | 5/1984 | Williams |
| 4,474,345 A | 10/1984 | Musgrove |
| 4,567,960 A | 2/1986 | Johnson et al. |
| 4,726,545 A | 2/1988 | Kress |

(Continued)

FOREIGN PATENT DOCUMENTS

| | | |
|---|---|---|
| CA | 2648765 C | 4/2011 |
| WO | 2010019131 A1 | 2/2010 |

OTHER PUBLICATIONS

Maykut, Albert R., United States Statutory Invention Registration H236, Mar. 3, 1987.

*Primary Examiner* — Rob Swiatek
*Assistant Examiner* — George Andonyan
(74) *Attorney, Agent, or Firm* — Raggio & Dinnin, P.C.

(57) ABSTRACT

A first trailing edge portion of a scarfed jet engine exhaust nozzle aft of a second trailing edge portion relative to a central axis of an associated exhaust duct causes an automatic nozzle-pressure-ratio responsive transverse deflection of the associated exhaust flow away from the first trailing edge portion. When offset from both the center of gravity (CG) and the central longitudinal axis of an aircraft, at a relatively low nozzle pressure ratio, e.g. during takeoff, the thrust vector from the exhaust flow acts relatively close to the CG, whereas at a relatively high nozzle pressure ratio, e.g. during relatively high-speed cruise, the scarfed exhaust nozzle deflects the exhaust flow so that the resulting thrust vector is relatively parallel to the path of the aircraft. With the final portion of the exhaust duct skewed, the primary axis of the jet engine can be relatively parallel to the path of the aircraft.

6 Claims, 18 Drawing Sheets

(56) References Cited

U.S. PATENT DOCUMENTS

| | | |
|---|---|---|
| 4,949,918 A | 8/1990 | Arszman |
| 5,170,964 A * | 12/1992 | Enderle et al. ............... 244/52 |
| 5,524,827 A * | 6/1996 | Znamensky et al. ..... 239/265.33 |
| 6,070,830 A * | 6/2000 | Mueller et al. ............. 244/73 R |
| 6,415,598 B2 | 7/2002 | Pinker |
| 6,505,706 B2 | 1/2003 | Tse |
| 6,532,729 B2 | 3/2003 | Martens |
| 6,568,635 B2 * | 5/2003 | Carpenter ..................... 244/82 |
| 6,612,106 B2 | 9/2003 | Balzer |
| 6,969,028 B2 | 11/2005 | Dun |
| 7,165,744 B2 * | 1/2007 | Howarth et al. ............... 244/55 |
| 2007/0176053 A1 * | 8/2007 | Bigot et al. ................ 244/53 R |
| 2012/0233983 A1 * | 9/2012 | Bulman ........................ 60/229 |

* cited by examiner

US 8,746,613 B2

JET ENGINE EXHAUST NOZZLE AND ASSOCIATED SYSTEM AND METHOD OF USE

CROSS-REFERENCE TO RELATED APPLICATIONS

The instant application claims the benefit of prior U.S. Provisional Application Ser. No. 61/090,597 filed on 20 Aug. 2008, which is incorporated herein by reference.

DESCRIPTION OF EMBODIMENT(S)

Figure 1:
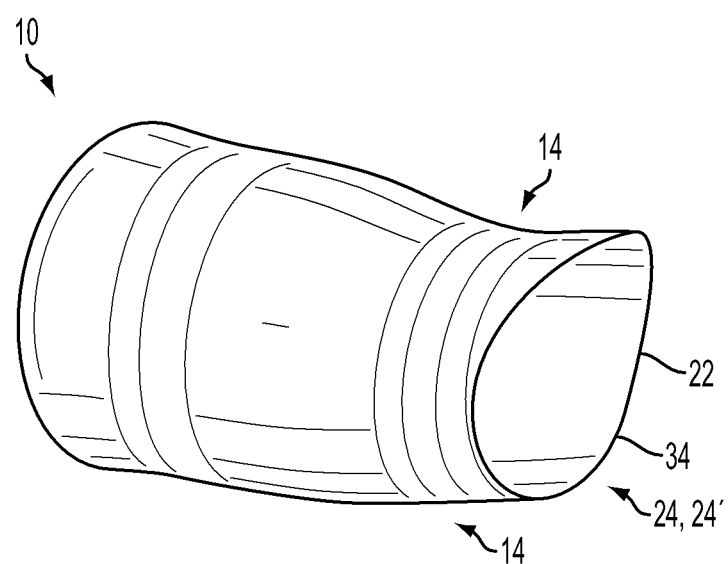
FIG. 1 illustrates an isometric view of a first embodiment of an exhaust duct and exhaust nozzle of a jet engine.

Referring to FIGS. 1, 2, 4a-4d, 6a and 6b, an exhaust duct 10 of a jet engine 12 is curved 14 in a turning region 14' so that a central axis 16 of a final portion 10.1 of the exhaust duct 10 is skewed in a direction of skew 18 at an angle α relative to the nominal primary axis 20 of the jet engine 12 along which a jet engine 12 typically exhibits the least aerodynamic drag. For example, for a gas turbine engine, the primary axis 20 is the axis about which the associated compressor and turbine of the jet engine 12 rotate, and for other types of jet engines, the primary axis 20 is the axis of flow of exhaust gases into the exhaust duct 10. As used herein, the term "jet engine" is intended to broadly mean an engine that ejects a jet or stream of gas or fluid, obtaining all or most of its thrust by reaction to the ejection, and is intended to include, but not be limited to, a gas turbine engine, a turbojet engine, a pulsejet engine, a ramjet engine or a rocket engine. The exhaust duct 10 is terminated at a terminus 22 that is scarfed so as to form an exhaust nozzle 24 having a first trailing edge portion 26 that on a first side 28 of the exhaust duct 10 in the direction of skew 18 is aft of a second trailing edge portion 30 on a second side 32 of the exhaust duct 10 opposite thereto, relative to the central axis 16.

Figure 2:
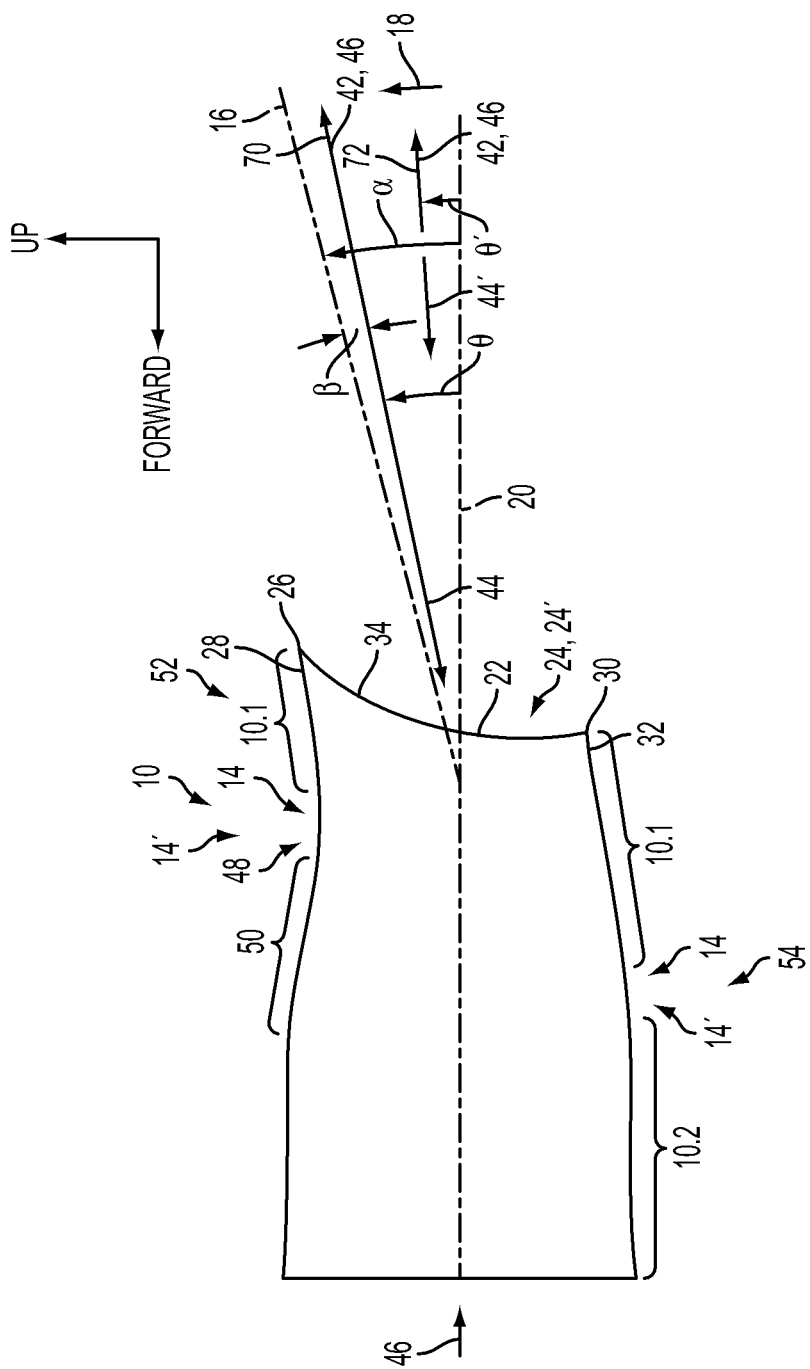
FIG. 2 illustrates a side view of the first embodiment of the exhaust duct and exhaust nozzle illustrated in FIG. 1.
Figure 3:
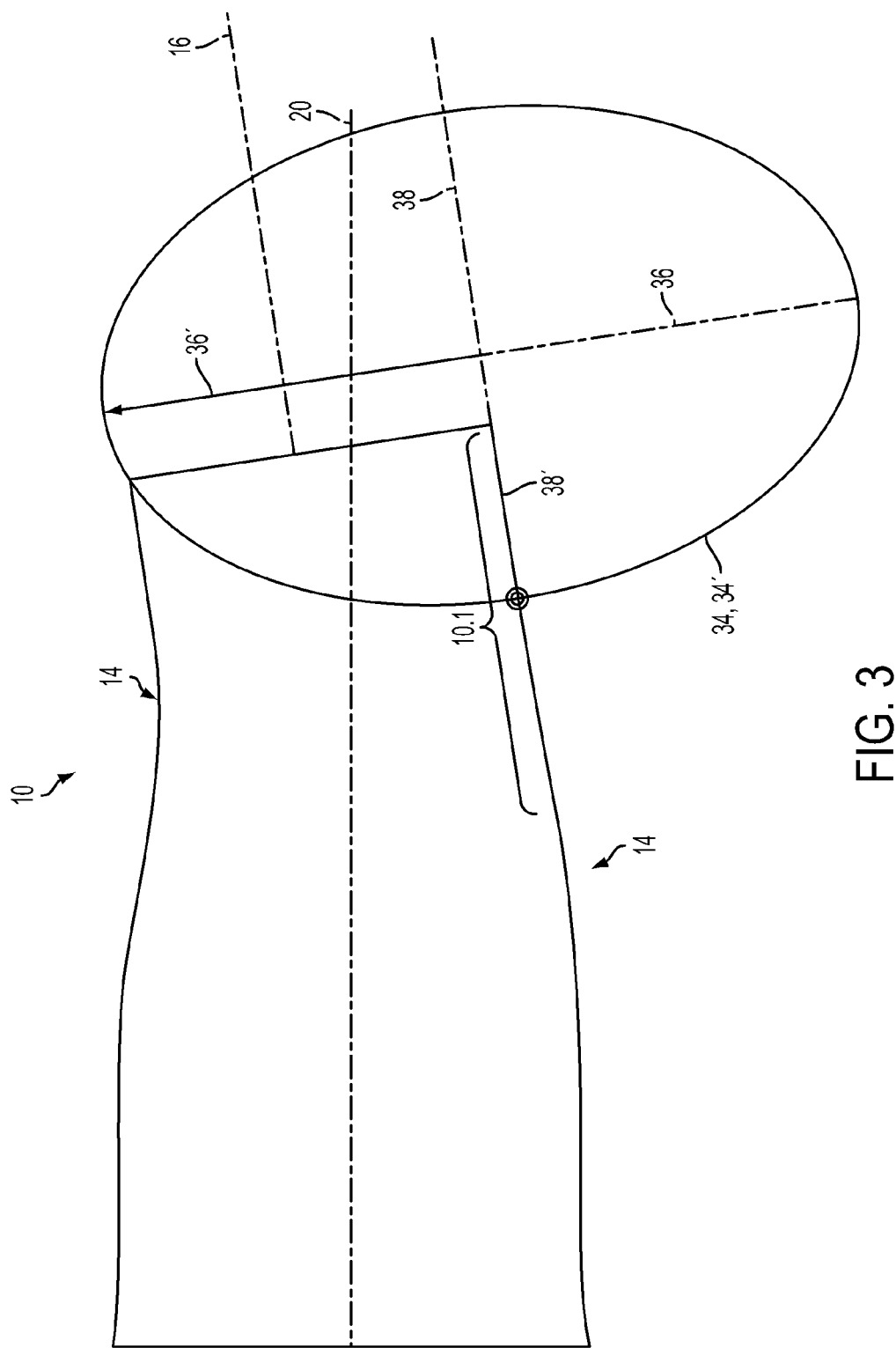
FIG. 3 illustrates a side view of an exhaust duct of a jet engine, and a cross-sectional view of a bounding surface through the exhaust duct used to generate the exhaust nozzle illustrated in FIGS. 1 and 2.

More particularly, referring to FIGS. 1-3, in a first embodiment of an exhaust duct 10 and associated exhaust nozzle 24, 24', the exhaust nozzle 24, 24' is scarfed so as to follow a concave bounding surface 34 (also known as a "Concave Surface") running transversely through the exhaust duct 10. For example, in one embodiment, the concave bounding surface 34 is a concave elliptical prismatic bounding surface with a major axis 36 of an underlying ellipse 34' of the concave bounding surface 34 substantially perpendicular to the central axis 16 of the final portion 10.1 of the exhaust duct 10, and with a minor axis 38 of the underlying ellipse 34' substantially parallel to the central axis 16 and substantially aligned with the second side 32 of the exhaust duct 10. FIG. 3 illustrates a hypothetical final portion 10.1 of the exhaust duct 10 being cut by the concave bounding surface 34 so as to form the scarfed exhaust nozzle 24. For example, in a simulated embodiment, the dimensions of the associated major 36' and minor 38' radii were 16.2 inches and 10.5 inches respectively, for an exhaust duct 10 having a nominal diameter of 15.5 inches at the throat of the associated exhaust nozzle 24.

Figure 6A:
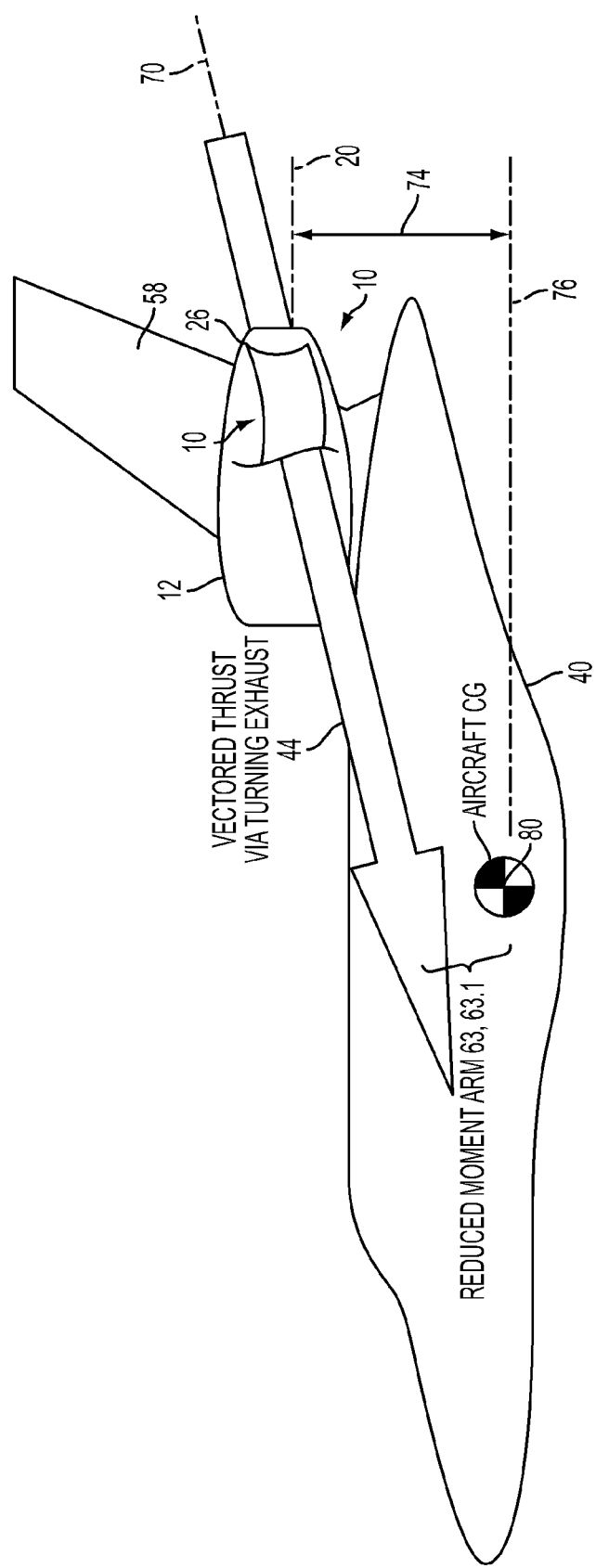
FIG. 6a illustrates a thrust vector in relation to a center of gravity of an aircraft incorporating a jet engine depending from the vertical stabilizer of the aircraft and providing for automatic pressure-ratio responsive pitch compensation, wherein the jet engine incorporates an exhaust duct and exhaust nozzle generally in accordance with FIGS. 1 and 2 or FIG. 7a, during takeoff conditions.
Figure 6B:
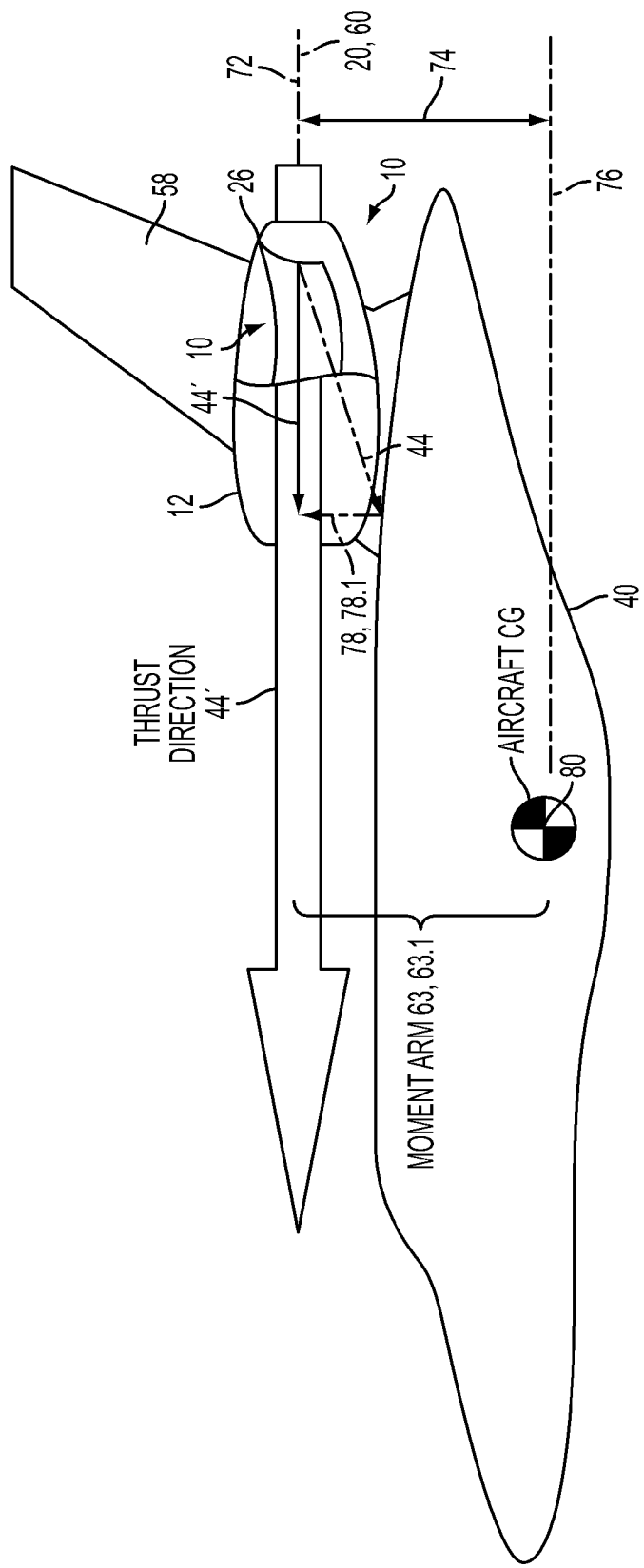
FIG. 6b illustrates the thrust vector in relation to a center of gravity of the aircraft and jet engine illustrated in FIG. 6a, but during relatively high-speed cruise conditions.

Accordingly, referring to FIGS. 2, 6a and 6b, when the jet engine 12 is installed in an aircraft 40 and operated at a relatively low nozzle pressure ratio (NPR)—the ratio of the absolute pressure at the exhaust nozzle 24 to the ambient absolute pressure,—for example, during sea level (SL) take off, at relatively low power conditions, or relatively low aircraft speeds,—exhaust 42 from the jet engine 12 discharges substantially along, or at least relatively close to, the central axis 16 of the final portion 10.1 of the exhaust duct 10 so that the resulting thrust vector 44 is directed at a relatively small angle $\beta$ relative to the central axis 16 of a final portion 10.1 of the exhaust duct 10. Accordingly, with the final portion 10.1 of the exhaust duct 10 skewed relative to the primary axis 20 of the jet engine 12, under these conditions, the exhaust 42 from the jet engine 12 discharges at a relatively high deflection angle $\theta$ relative to the primary axis 20 of the jet engine 12. Accordingly, when the jet engine 12 is operated at a relatively low nozzle pressure ratio (NPR), the angle $\beta$ approaches zero, and the deflection angle $\theta$ approaches or is substantially equal to the angle $\alpha$ by which the final portion 10.1 of the exhaust duct 10 is skewed relative to the primary axis 20 of the jet engine 12.

Referring to FIG. 2, the exhaust stream 46 is accelerated into a nozzle throat 48 through a converging region 50. The convergence and turning of the exhaust stream 46 can be done either simultaneously, or separately, in either order. After the nozzle throat 48, the inside turning surface 52 is extended for some distance along the first trailing edge portion 26 beyond where the outer turning surface 54 is terminated by the second trailing edge portion 30.

Figure 4A:
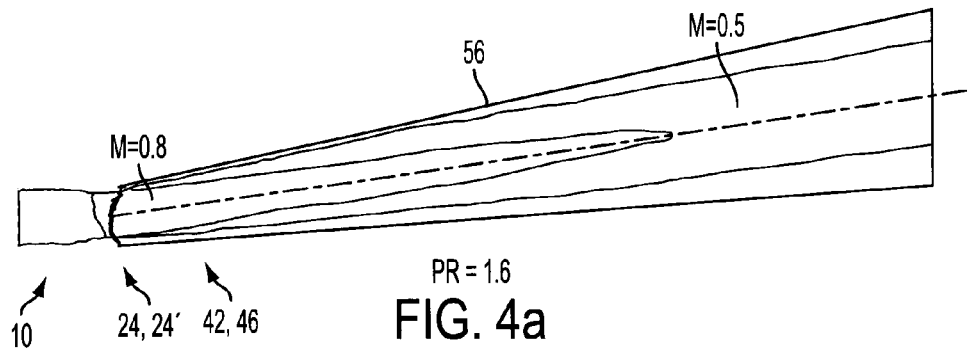
FIG. 4a illustrates a simulation of exhaust flowing from the exhaust nozzle illustrated in FIGS. 1 and 2 for an associated nozzle pressure ratio of about 1.6.
Figure 4B:
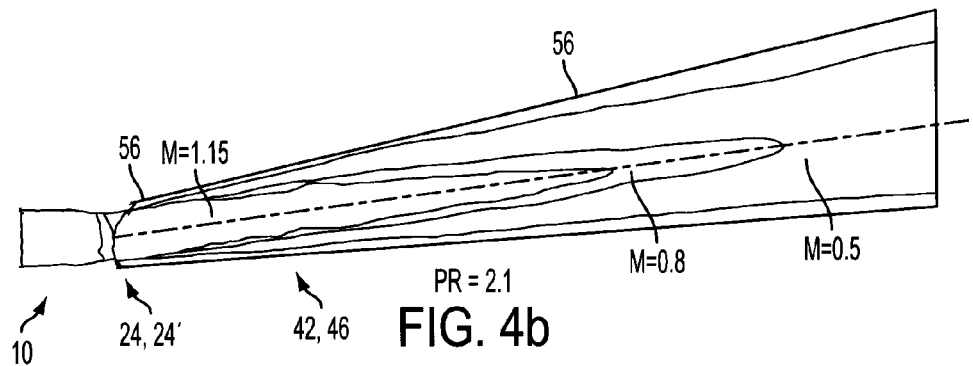
FIG. 4b illustrates a simulation of exhaust flowing from the exhaust nozzle illustrated in FIGS. 1 and 2 for an associated nozzle pressure ratio of about 2.1.
Figure 4C:
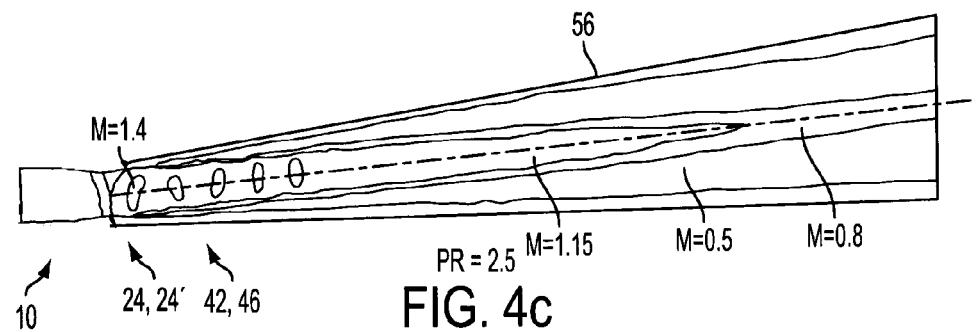
FIG. 4c illustrates a simulation of exhaust flowing from the exhaust nozzle illustrated in FIGS. 1 and 2 for an associated nozzle pressure ratio of about 2.5.
Figure 4D:
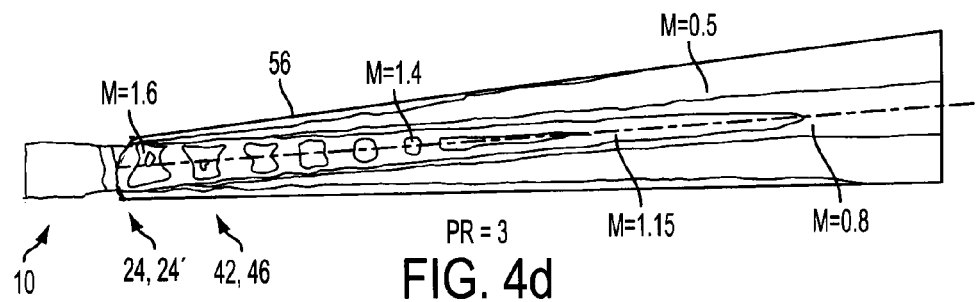
FIG. 4d illustrates a simulation of exhaust flowing from the exhaust nozzle illustrated in FIGS. 1 and 2 for an associated nozzle pressure ratio of about 3.

FIGS. 4a-4d respectively illustrate the results of computational fluid dynamics simulations of an exhaust stream 46 from the exhaust nozzle 24 at nozzle pressure ratios (NPR) of 1.6, 2.1, 2.5 and 3, respectively under static conditions that were adjusted to simulate the associated flight conditions. As the nozzle pressure ratio (NPR) of the jet engine 12 is increased, the exhaust stream 46 is directed at an increasing angle away from the first trailing edge portion 26 on the first side 28 of the exhaust duct 10, so that the angle $\beta$ of the associated thrust vector 44 relative to the central axis 16 of a final portion 10.1 of the exhaust duct 10 increases, and the associated deflection angle $\theta$ of the associated thrust vector 44 decreases, causing the associated thrust vector 44 to become more closely aligned with the primary axis 20 of the jet engine 12. Referring to FIGS. 4a and 4b, under relatively lower nozzle pressure ratio (NPR) conditions, the exhaust stream 46 follows the extended inside turning surface 52, thereby producing corresponding relatively high levels of overall turning. Referring to FIGS. 4c and 4d, at relatively higher nozzle pressure ratio (NPR) conditions, the exhaust nozzle 24 is under-expanded, so that the associated exhaust plume 56 attempts to expand against the extended inside turning surface 52, and is thereby deflected away so as to reduce the overall turning. This change in deflection angle $\theta$ as a function of nozzle pressure ratio (NPR) is passive and automatic, based upon the scarfed exit geometry of the exhaust nozzle 24 and the combined affect of the associated engine throttle setting, aircraft speed and ambient pressure.

Figure 5:
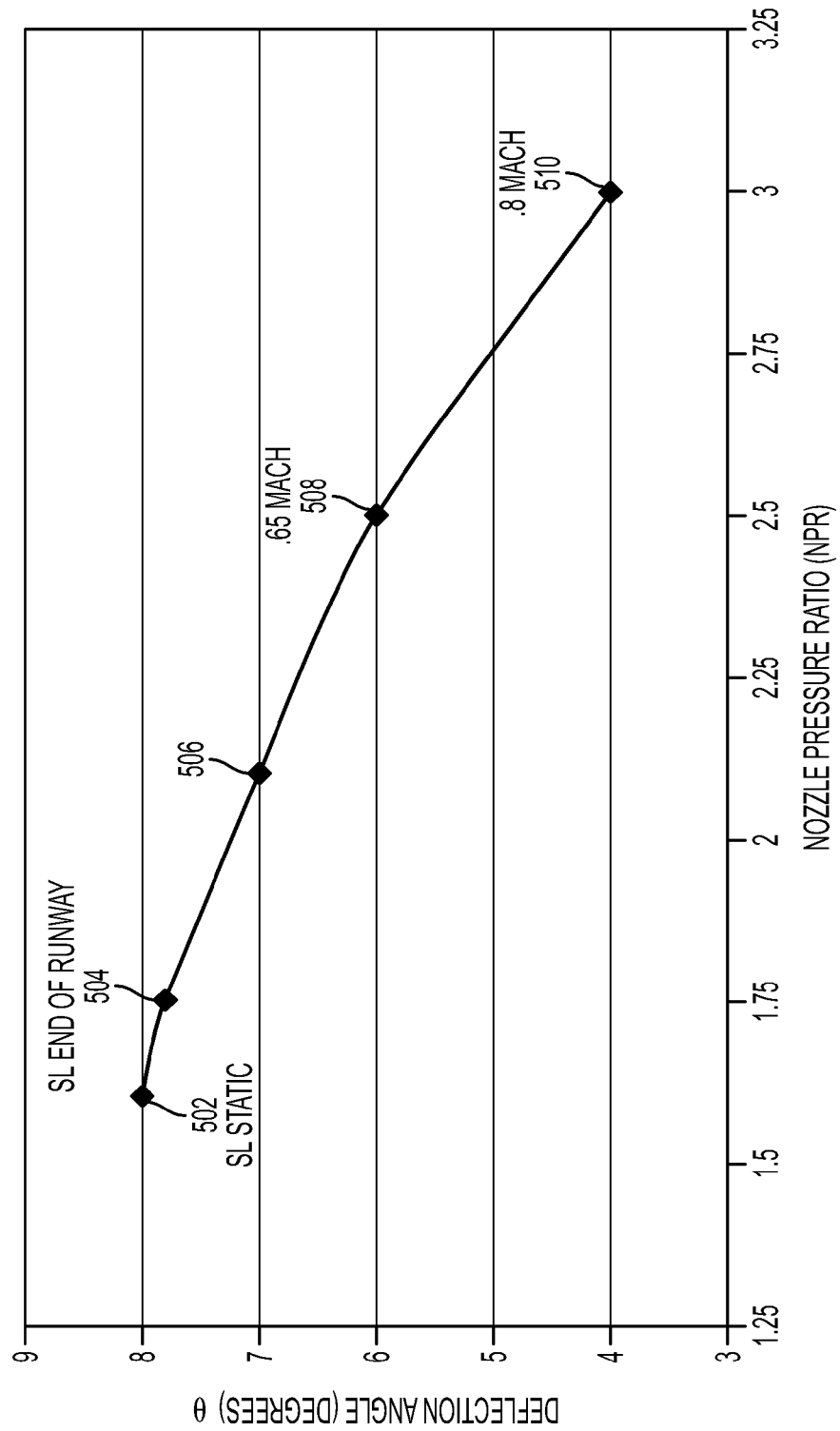
FIG. 5 illustrates a graph of deflection angle of a thrust vector from the associated exhaust flow as a function of nozzle pressure ratio, from simulations of exhaust flowing from the exhaust nozzle illustrated in FIGS. 1 and 2, which include as data points the conditions illustrated in FIGS. 4a-4d.

Referring to FIG. 5, based upon a computational fluid dynamics simulation of the exhaust duct 10 and exhaust nozzle 24 illustrated in FIGS. 1-3, the deflection angle $\theta$ of the thrust vector 44 decreases with associated nozzle pressure ratio (NPR) for a jet engine 12 operating in an aircraft 40. As indicated by point 502, at a sea level (SL) static operating condition, the jet engine 12 operates with a nozzle pressure ratio (NPR) of about 1.6, which results in a deflection angle $\theta$ of about 8 degrees. As indicated by point 504, at a sea level (SL) take-off with the aircraft 40 traveling at a speed of about 200-250 knots at the end of a runway at the beginning of climb, the nozzle pressure ratio (NPR) is about 1.75 as a result of the effect of ram pressure on the inlet of the jet engine 12, which results in a deflection angle $\theta$ of about 7.8 degrees. As indicated by point 506, at a speed of about 250 knots in mid climb, the nozzle pressure ratio (NPR) is about 2.1 which results in a deflection angle $\theta$ of about 7 degrees. As indicated by point 508, at a speed of 0.65 Mach, the nozzle pressure ratio (NPR) is about 2.5 which results in a deflection angle $\theta$ of about 6 degrees. Finally, as indicated by point 510, at a speed of 0.8 Mach, the nozzle pressure ratio (NPR) is about 3 which results in a deflection angle $\theta$ of about 4 degrees. Accordingly, the scarfed exhaust nozzle 24 provides for automatically reducing the deflection angle $\theta$ of the thrust vector 44 when the jet engine 12 is operated at a relatively high nozzle pressure ratio (NPR), for example, either at relatively high-speed cruise or relatively high power, relative to that at sea level take-off, which is at either relatively low speed or relatively low power. The particular nozzle pressure ratio (NPR) is responsive to the throttle setting/power level of the jet engine 12, and is also responsive to the associated flight speed of the aircraft 40 powered thereby. For example, the nozzle pressure ratio (NPR) generally increases with increasing throttle setting/power level, with increasing flight speed, and with increasing altitude or decreasing ambient pressure. The particular thrust vectoring characteristics of the exhaust nozzle 24 and jet engine 12 are dependent upon the amount and characteristics of curvature of the exhaust duct 10, and are dependent upon the exit surface scarf angle and scarf shape of the exhaust nozzle 24. For the example of the particular design used for the simulation associated with FIGS. 4a-4d and 5, the deflection angle $\theta$ of the thrust vector 44 was reduced by about 4 degrees at 0.8 Mach relative to that at take-off conditions.

Figure 7A:
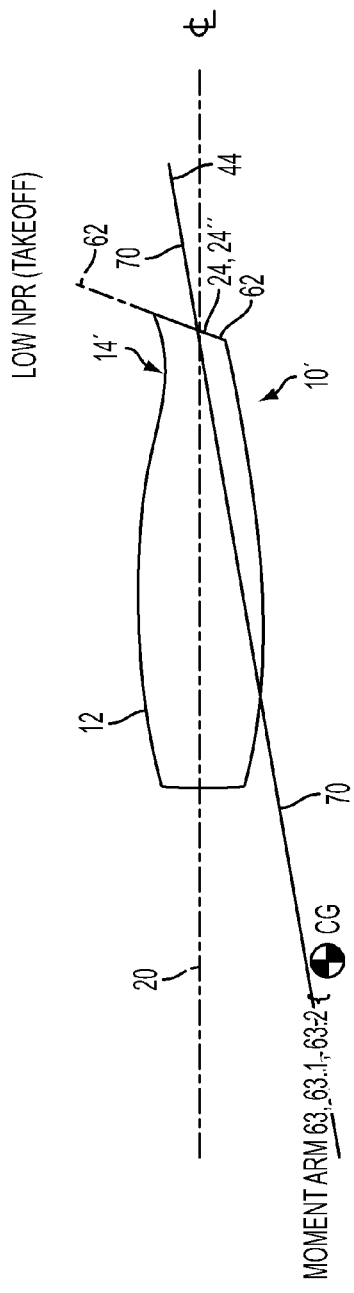
FIG. 7a illustrates a thrust vector in relation to a center of gravity of an aircraft incorporating a jet engine depending from the vertical stabilizer of the aircraft and providing for automatic pressure-ratio responsive pitch or yaw compensation, wherein the jet engine incorporates a second embodiment of an exhaust duct and exhaust nozzle, during takeoff conditions.
Figure 7B:
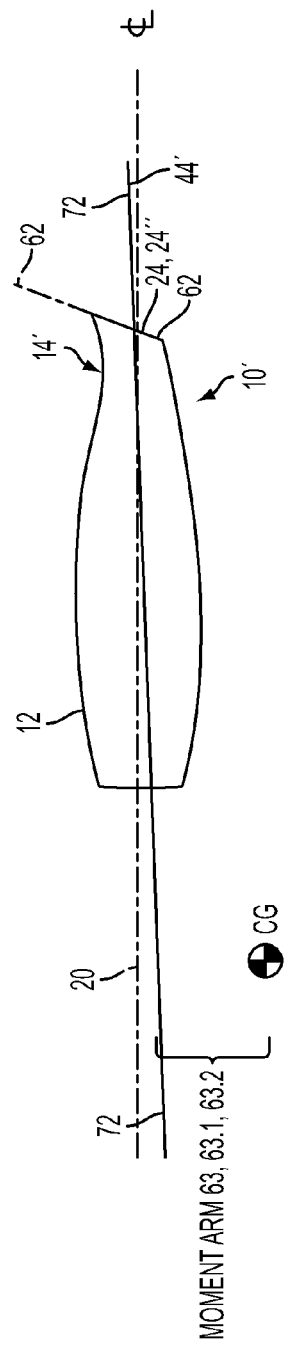
FIG. 7b illustrates the thrust vector in relation to a center of gravity of the aircraft and jet engine illustrated in FIG. 7a, but during relatively high-speed cruise conditions.

Referring to FIGS. 6a, 6b, 7a and 7b, this phenomenon can be used to provide for improved take-off stability without substantial compromise to relatively high-speed cruise performance and fuel economy, particularly for aircraft 40 for which the associated jet engine 12 is installed above and behind the center-of-gravity (CG) of the aircraft 40, for example, for the associated jet engine 12 depending from a vertical stabilizer 58 of the aircraft 40. More particularly, by incorporating the above-described exhaust duct 10 and exhaust nozzle 24 in the associated jet engine 12, with the curvature of the exhaust duct 10 directed generally upwards, and with the first trailing edge portion 26 located on the top of the jet engine 12, the jet engine 12 can be oriented with the primary axis 20 of the jet engine 12 substantially parallel to the path 60 of the aircraft 40 so as provide for reduced drag, while also providing for the associated thrust vector 44 therefrom to be directed downwards so as to act relatively close to the center-of-gravity (CG) of the aircraft 40 during take-off conditions, and to be directed substantially parallel to the path 60 of the aircraft 40 during relatively high-speed cruise conditions. Accordingly, referring to FIGS. 6a and 7a, with the thrust vector 44 acting relatively close to the center-of-gravity (CG) of the aircraft 40 during take-off conditions—as provided by the final portion 10.1 of the exhaust duct 10 being oriented obliquely upwards so as to provide for an obliquely upwardly directed exhaust stream 46 at relatively low nozzle pressure ratios (NPR), —the associated nose-down pitching moment associated with the thrust vector 44 is relatively reduced, so that relatively lower elevator and trim deflections are needed to stabilize the aircraft 40 during take-off conditions than would be needed absent the downwardly directed thrust vector 44, so that in the event of catastrophic loss of power during take-off, the aircraft 40 would be less susceptible to a sudden pitch-up condition than would otherwise result absent the downwardly directed thrust vector 44. Referring to FIGS. 6b and 7b, a thrust vector 44' relatively parallel to the path 60 of the aircraft 40 during relatively high-speed cruise conditions—as provided by relatively less upwards deflection of the exhaust stream 46 because of the nature of the scarfed exhaust nozzle 24 at relatively high nozzle pressure ratios (NPR)—provides for improved fuel economy relative to the fuel economy if the exhaust stream 46 was not so directed. Similarly, orienting the jet engine 12 so that its primary axis 20 is substantially parallel to the path 60 of the aircraft 40 provides for reducing the associated aerodynamic drag, relative to an oblique orientation of the jet engine 12.

Referring again to FIGS. 7a and 7b, there is illustrated a jet engine 12 comprising a second embodiment of an exhaust duct 10', which is curved 14 in a turning region 14', and which is then terminated at a terminus 22 that is scarfed with a skewed planar bounding surface 62 so as to form an associated second embodiment of an exhaust nozzle 24".

Figure 8A:
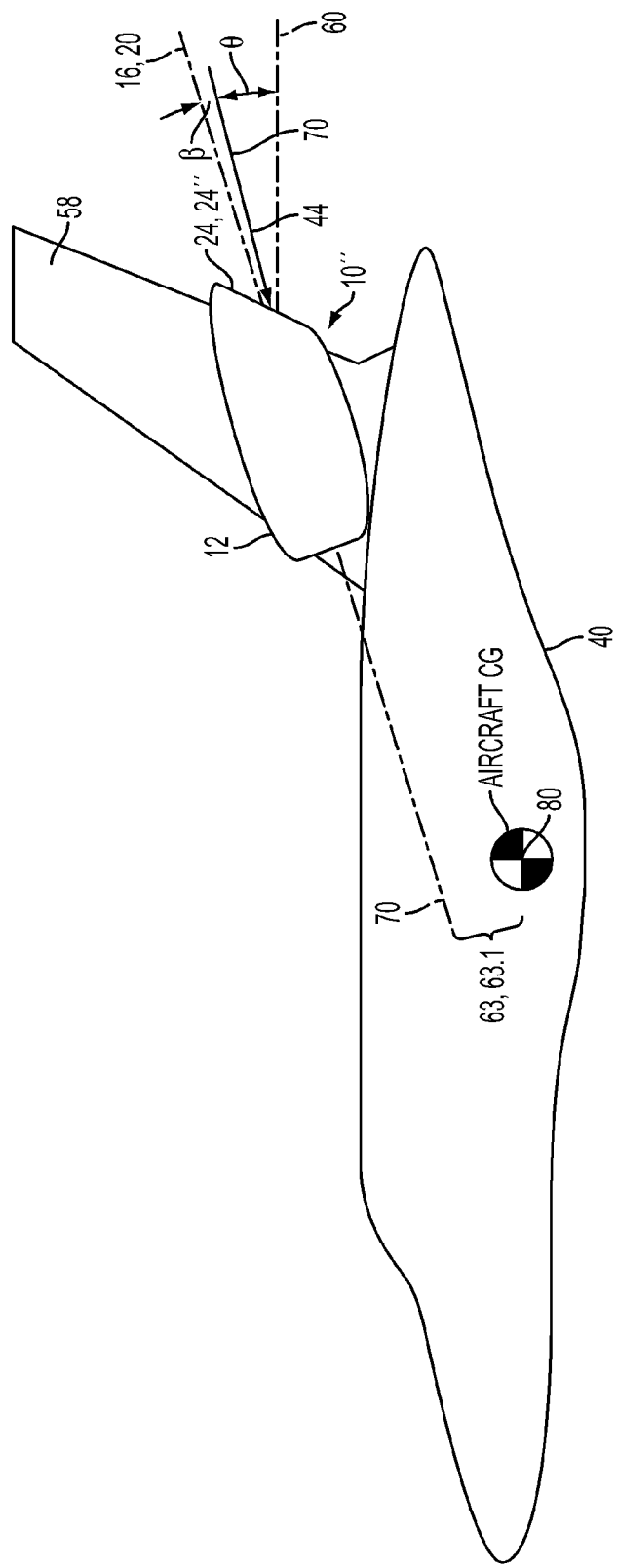
FIG. 8a illustrates a thrust vector in relation to a center of gravity of an aircraft incorporating a jet engine depending from the vertical stabilizer of the aircraft and providing for automatic pressure-ratio responsive pitch compensation, wherein the jet engine incorporates a third embodiment of an exhaust duct incorporating the second embodiment of the exhaust nozzle, during takeoff conditions.
Figure 8B:
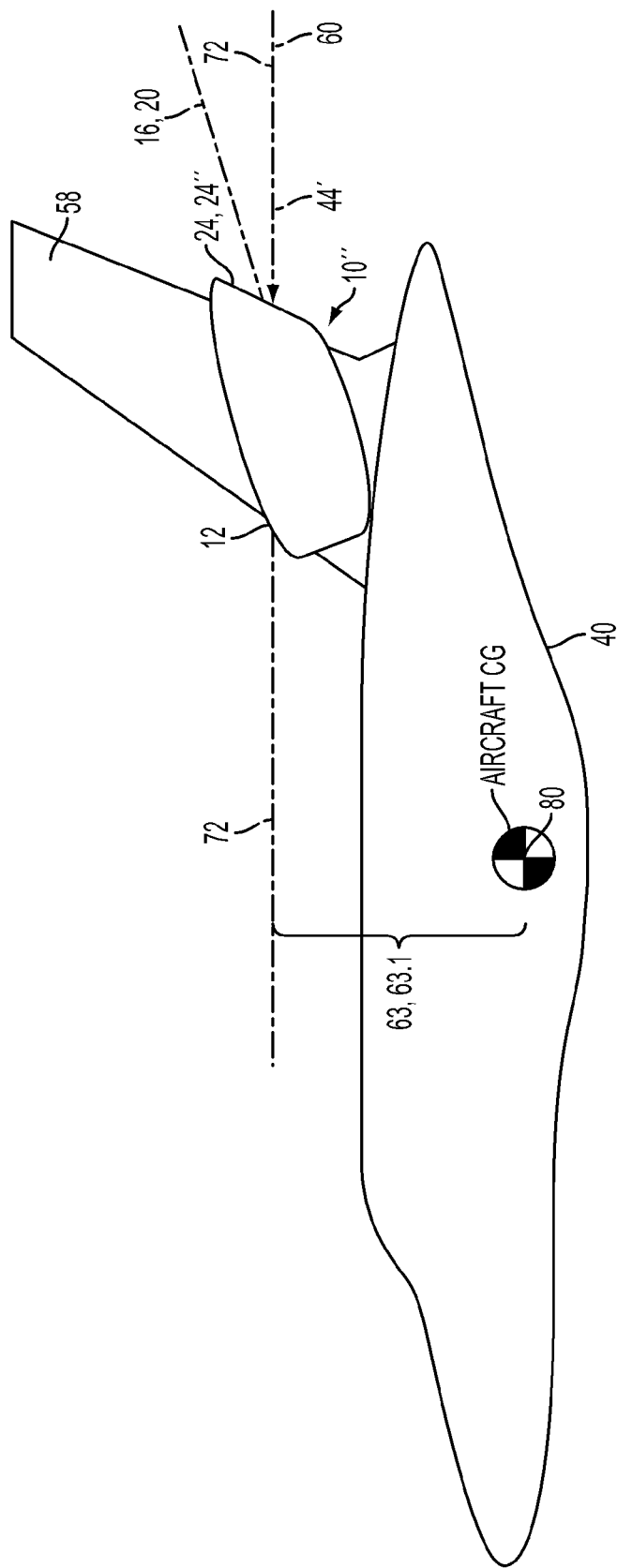
FIG. 8b illustrates the thrust vector in relation to a center of gravity of the aircraft and jet engine illustrated in FIG. 8a, but during relatively high-speed cruise conditions.

Referring to FIG. 8a, a jet engine 12 depending from a vertical stabilizer 58 of an aircraft 40 incorporates a third embodiment of an exhaust duct 10", which is substantially straight, incorporating the second embodiment of the exhaust nozzle 24", wherein the primary axis 20 of the jet engine 12 is skewed so as to orient the jet engine 12 so that under take-off or relatively low power conditions, the associated thrust vector 44 from the associated exhaust stream 46 is downwardly directed so as to act relatively close to the center-of-gravity (CG) of the aircraft 40, so as to reduce the associated pitch moment arm 63.1 so that the associated nose-down pitching moment associated with the thrust vector 44 is relatively reduced, so that relatively lower elevator and trim deflections are needed to stabilize the aircraft 40 during take-off conditions than would be needed absent the downwardly directed thrust vector 44, so that in the event of catastrophic loss of power during take-off, the aircraft 40 would be less susceptible to a sudden pitch-up condition than would otherwise result absent the downwardly directed thrust vector 44. Referring to FIG. 8b, under conditions of relatively high nozzle pressure ratio (NPR), for example, during relatively high-speed or relatively high-altitude cruise, the scarfed exhaust nozzle 24 provides for relatively downwardly directing the exhaust stream 46 relative to the primary axis 20 of the jet engine 12, which results in an associated thrust vector 44' that is relatively parallel to the path 60 of the aircraft 40, which provides for better fuel efficiency than if the thrust vector 44 had not been so deflected. The skewing of the jet engine 12 so as to provide for a downwardly directed thrust vector 44 results in a relatively higher aerodynamic drag relative to that which would result if the primary axis 20 of the jet engine 12 were substantially parallel to the path 60 of the aircraft 40, however, under relatively high-speed cruise conditions, the resulting inefficiency is offset by the deflection angle θ of the exhaust stream 46 from the action of the scarfed exhaust nozzle 24, and the affect of this drag is reduced at relatively high altitudes where the associated air density is relatively low.

In addition to concave 34 and planar 62 bounding surfaces, generally the associated exhaust nozzle 24 can be scarfed to follow a bounding surface so that the shape of the resulting scarfed exhaust nozzle 24 is such that associated first trailing edge portion 26 is extended in locations substantially only where the associated internal surface pressure is higher than the associated external ambient pressure at relatively high nozzle pressure ratio (NPR), e.g. under relatively highest speed cruise conditions, so as to utilize the associated pressure distribution on the internal surface to provide for a change in deflection angle θ of the exhaust stream 46 responsive to a change of the associated nozzle pressure ratio (NPR).

Figure 9:
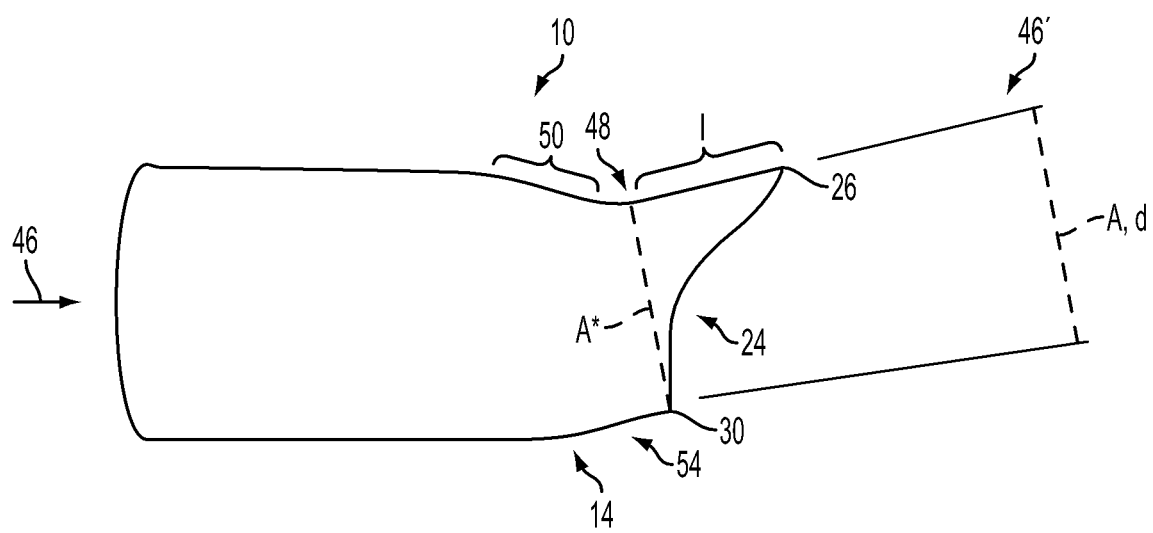
FIG. 9 illustrates an embodiment of an exhaust duct and exhaust nozzle of a jet engine.

For example, referring to FIG. 9, the length l by which the first trailing edge portion 26 extends aft of the second trailing edge portion 30 is determined for a representative flight design point of the jet engine 12 in the aircraft 40, whereby given the associated nozzle pressure ratio (NPR) at the flight design point, the area A of the associated fully expanded exhaust stream 46' can be calculated from associated compressible flow functions. For a given nozzle pressure ratio (NPR), the corresponding associated fully expanded Mach number M is given by:

$$M = \sqrt{\left(NPR^{\frac{\gamma-1}{\gamma}} - 1\right)\frac{2}{\gamma-1}} \quad (1)$$

and from the Mach number M, the ratio of the area A of the associated fully expanded exhaust stream 46' to the area A* of the nozzle throat 48 is given by:

$$\frac{A}{A^*} = \frac{1}{M}\left[\frac{2\left(1+\frac{\gamma-1}{2}M^2\right)}{\gamma+1}\right]^{\frac{\gamma+1}{2(\gamma-1)}} \quad (2)$$

wherein for supersonic exhaust, the exhaust stream area A is greater than the area A* of the nozzle throat 48, with the exhaust speed at the nozzle throat 48 being sonic. The effective diameter d of the fully expanded exhaust stream 46' is given by:

$$d = \sqrt{\frac{4A}{\pi}} \qquad (3)$$

from which, for one set of embodiments, the length l by which the first trailing edge portion 26 extends aft of the second trailing edge portion 30 is between about 0.1 and 3 times this effective diameter d.

Figure 10A:
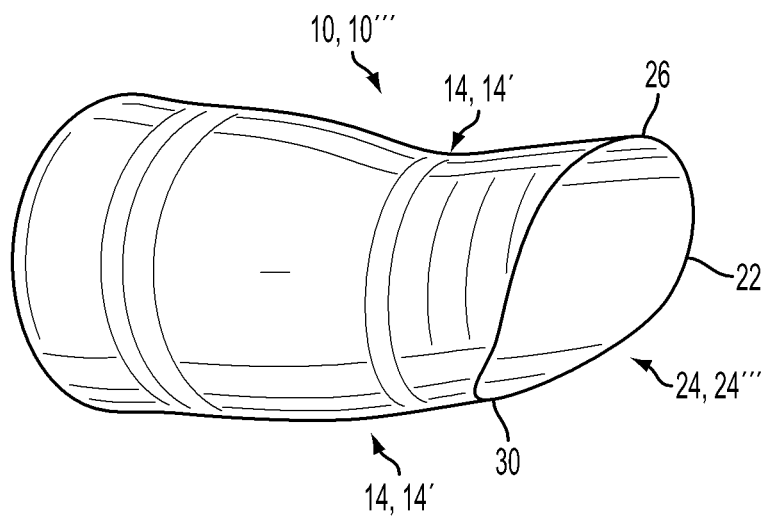
FIG. 10a illustrates an isometric view of a fourth embodiment of an exhaust duct and a third embodiment of an exhaust nozzle of a jet engine.
Figure 10B:
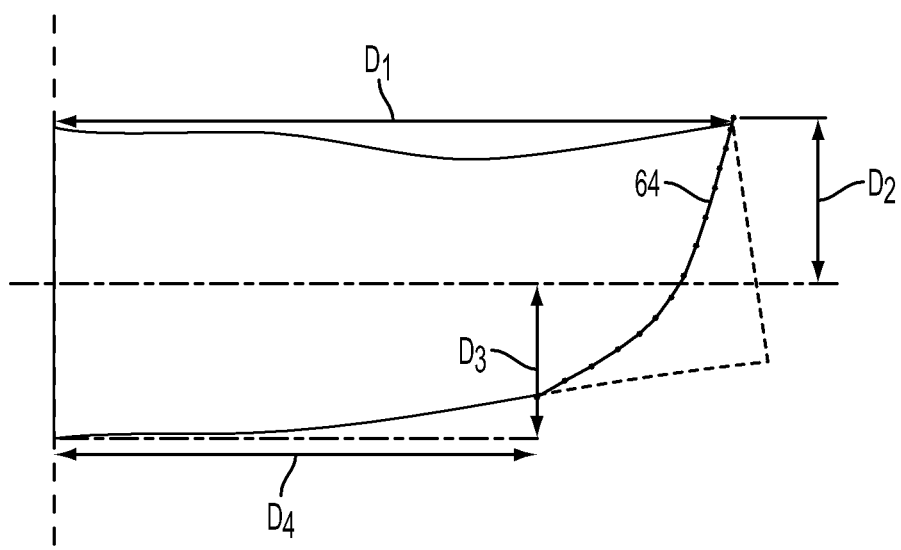
FIG. 10b illustrates a side view of the exhaust duct and exhaust nozzle illustrated in FIG. 10a, and an end view of an associated bounding surface through the exhaust duct used to generate the third embodiment of the exhaust nozzle.
Figure 11A:
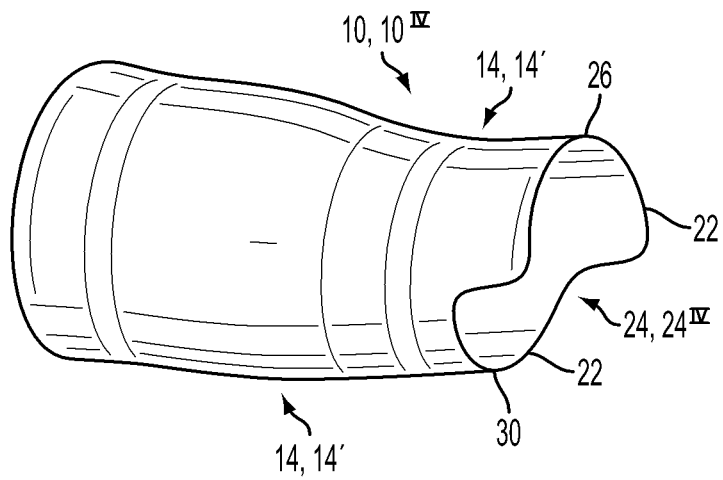
FIG. 11a illustrates an isometric view of a fifth embodiment of an exhaust duct and a fourth embodiment of an exhaust nozzle of a jet engine.
Figure 11B:
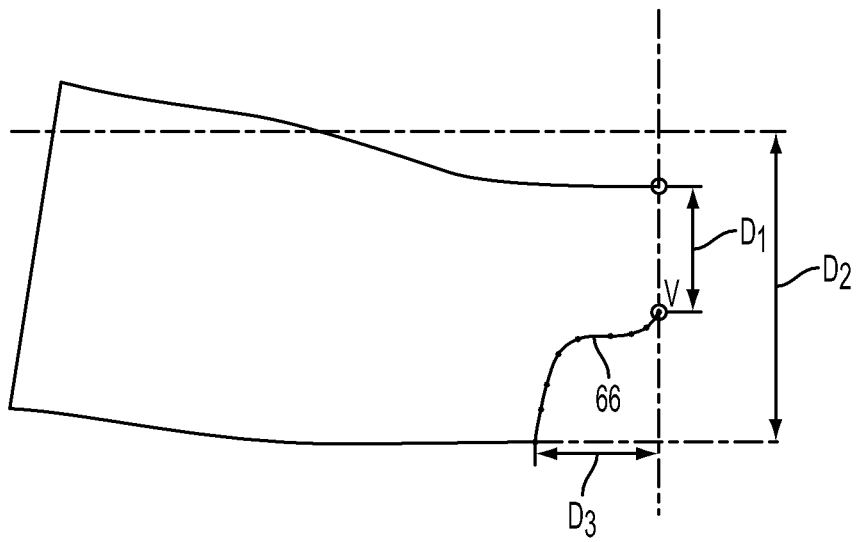
FIG. 11b illustrates a side view of the exhaust duct and exhaust nozzle illustrated in FIG. 11a, and an end view of an associated bounding surface through the exhaust duct used to generate the fourth embodiment of the exhaust nozzle.
Figure 12A:
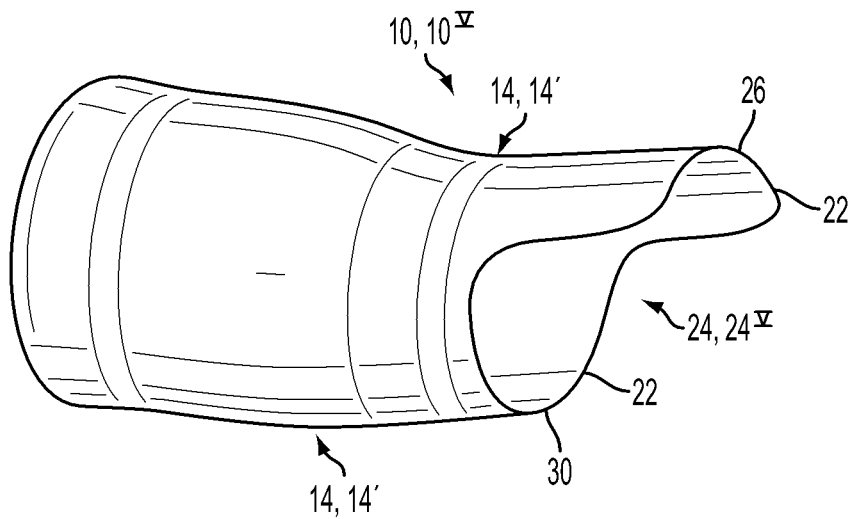
FIG. 12a illustrates an isometric view of a sixth embodiment of an exhaust duct and a fifth embodiment of an exhaust nozzle of a jet engine.
Figure 12B:
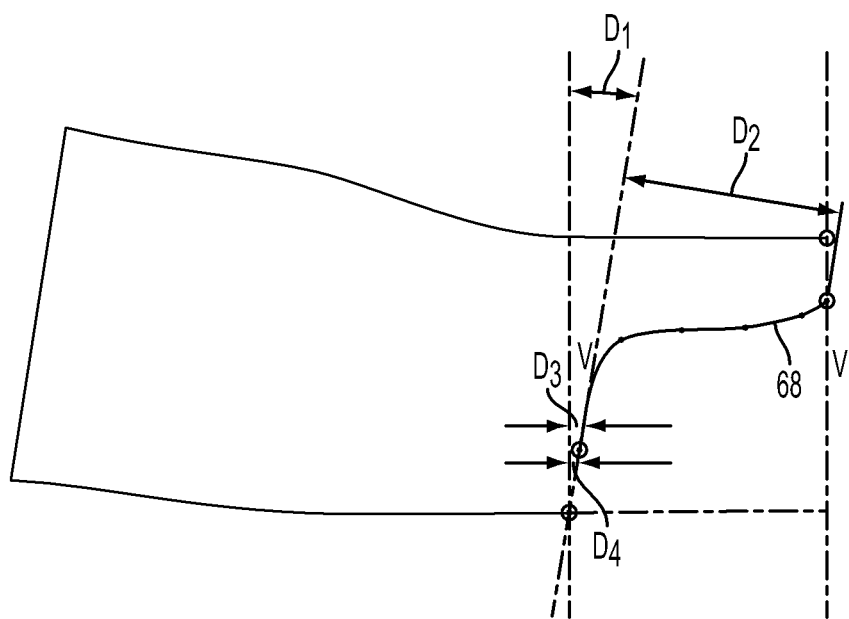
FIG. 12b illustrates a side view of the exhaust duct and exhaust nozzle illustrated in FIG. 12a, and an end view of an associated bounding surface through the exhaust duct used to generate the fifth embodiment of the exhaust nozzle.
Figure 13:
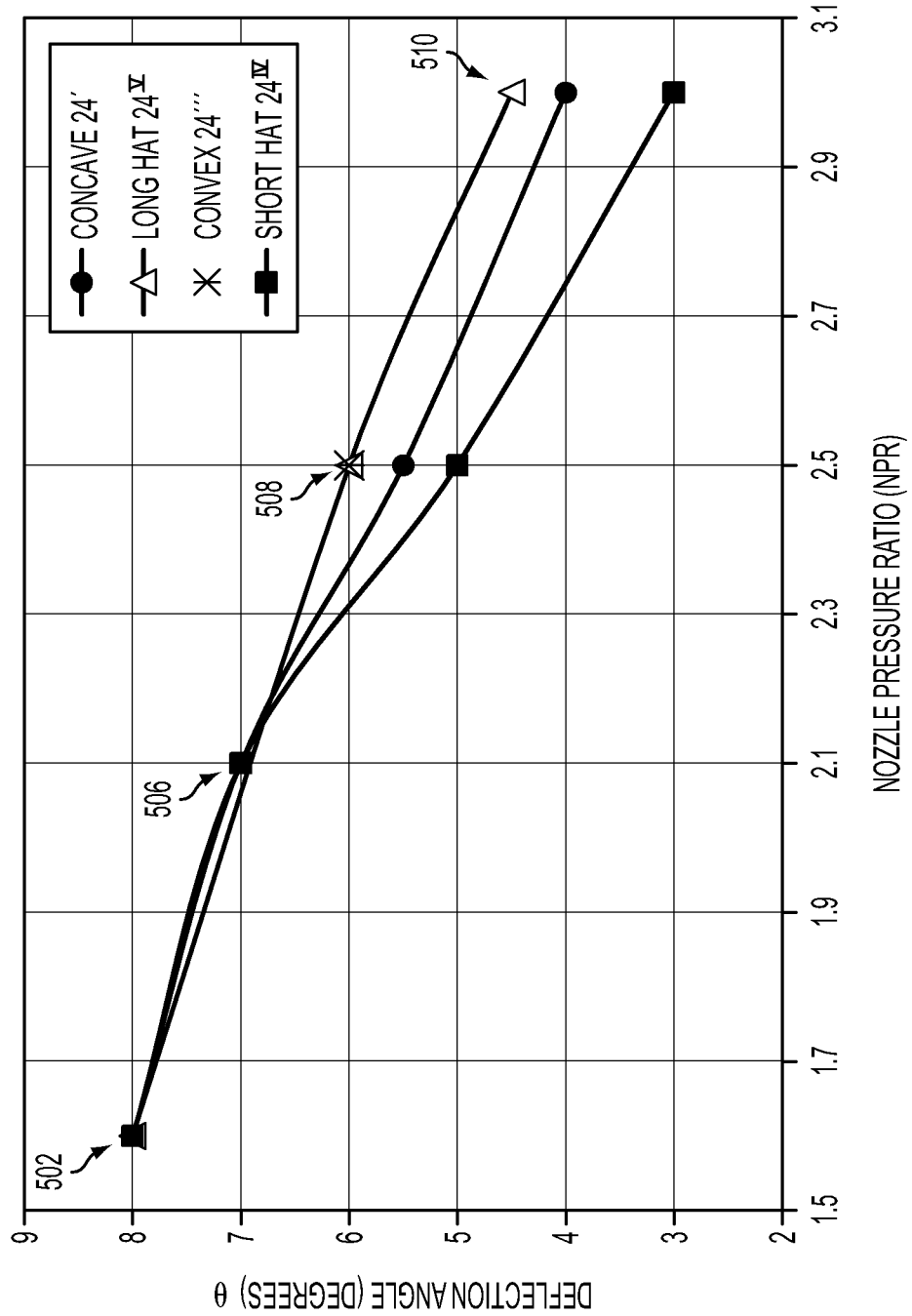
FIG. 13 illustrates a graph of deflection angle of a thrust vector from the associated exhaust flow as a function of nozzle pressure ratio, from simulations of exhaust flowing from the exhaust nozzles illustrated in FIGS. 1 and 2, 10a and 10b, 11a and 11b and 12a and 12b, which include as data points the conditions illustrated in FIGS. 4a-4d.

Examples of other types of exhaust nozzles 24 are illustrated in FIGS. 10a-b, 11a-b and 12a-b. For example, referring to FIGS. 10a and 10b, there is illustrated a fourth embodiment of an exhaust duct 10''', which is curved 14 in a turning region 14', and which is then terminated at a terminus 22 that is scarfed with a convex cutting surface 64 (also referred to as a "Convex Surface"), for example, formed using a convex spline, for example, parameterized by parameters D1, D2, D3 and D4 as illustrated in FIG. 10b, so as to form an associated third embodiment of an exhaust nozzle 24''''. Furthermore, referring to FIGS. 11a and 11b, there is illustrated a fifth embodiment of an exhaust duct $10^{IV}$, which is curved 14 in a turning region 14', and which is then terminated at a terminus 22 that is scarfed by undercutting the exhaust duct 10 with an associated cutting surface 66, for example, parameterized by parameters D1, D2 and D3 as illustrated in FIG. 11b, so as to form an associated fourth embodiment of an exhaust nozzle $24^{IV}$ (also referred to as a "Short Hat" configuration), wherein the associated first trailing edge portion 26 of roughly half the circumference of the exhaust duct 10 is extended a distance of about one half diameter d aft of the associated second trailing edge portion 30. Yet further, referring to FIGS. 12a and 12b, there is illustrated a sixth embodiment of an exhaust duct $10^{V}$, which is curved 14 in a turning region 14', and which is then terminated at a terminus 22 that is scarfed by undercutting the exhaust duct 10 with an associated cutting surface 68, for example, parameterized by parameters D1, D2, D3 and D4 as illustrated in FIG. 12b, so as to form an associated fifth embodiment of an exhaust nozzle $24^{V}$ (also referred to as a "Long Hat" configuration), wherein the associated first trailing edge portion 26 of roughly one third of the circumference of the exhaust duct 10 is extended a distance of about one diameter d aft of the associated second trailing edge portion 30. Referring to FIG. 13, based upon a computational fluid dynamics simulation of the exhaust ducts 10, 10''', $10^{IV}$, $10^{V}$ and exhaust nozzles 24, 24', 24''', $24^{IV}$, $24^{V}$ illustrated in FIGS. 1-3, 10a-b, 11a-b and 12a-b, the deflection angle θ of the thrust vector 44, 44' decreases with associated nozzle pressure ratio (NPR) for a jet engine 12 operating in an aircraft 40, wherein the amount of deflection is also dependent upon the configuration of the associated exhaust nozzles 24, 24', 24''', $24^{IV}$, $24^{V}$. The simulations were made at the same operating conditions of points 502, 506, 508 and 510 as illustrated in FIG. 5.

Referring again to FIGS. 2, 6a, 6b, 7a, 7b, 8a and 8b, in accordance with a first aspect, a method of operating a jet engine aircraft 40 comprises ejecting a stream of exhaust gas 46 in a first direction 70 from a nozzle 24 operatively coupled to or a part of a jet engine 12 attached to the jet engine aircraft 40 responsive to operating the jet engine 12 according to a first operating condition at a first point in time; ejecting the stream of exhaust gas 46 in a second direction 72 from the nozzle 24 responsive to operating the jet engine 12 according to a second operating condition at a second point in time, wherein the jet engine 12 is offset 74 from a center-of-gravity (CG) of the jet engine aircraft 40 relative to a central longitudinal axis 76 of the jet engine aircraft 40 through the center-of-gravity (CG), a nozzle pressure ratio (NPR) of the nozzle 24 at the first operating condition is less than the nozzle pressure ratio (NPR) of the nozzle 24 at the second operating condition, the first point in time is different from the second point in time, a first thrust vector 44 of the jet engine 12 associated with the first direction 70 under the first operating condition has a smaller moment arm 63 relative to the center-of-gravity (CG) of the jet engine aircraft 40 than does a second thrust vector 44' of the jet engine 12 associated with the second direction 72 under the second operating condition relative to the central longitudinal axis 76 of the jet engine aircraft 40, and a difference between the first direction 70 and the second direction 72 is automatically responsive to an interaction of the stream of exhaust gas 46 with the nozzle 24. In accordance with one sub-aspect, illustrated inter alia in FIGS. 2, 6a, 6b, 7a and 7b, the first direction 70 is relatively oblique to a central axis 20 of the jet engine 12 upstream of the nozzle 24. In accordance with another sub-aspect, illustrated inter alia in FIGS. 8a and 8b, the first direction 70 is substantially aligned with a central axis 20 of the jet engine 12 upstream of the nozzle 24.

In accordance with another aspect, a jet engine aircraft 40 comprises a jet engine 12 attached to the jet engine aircraft 40 at a location that is offset 74 from a center-of-gravity (CG) of the jet engine aircraft 40 relative to a central longitudinal axis 76 through the center-of-gravity (CG) of the jet engine aircraft 40; a nozzle 24 operatively coupled to or a part of the jet engine 12 adapted to receive and eject a stream of exhaust gas 46 generated by the jet engine 12, wherein a central axis 16 of a final portion 10.1 of the nozzle 24 is oriented obliquely towards the center-of-gravity (CG) of the jet engine aircraft 40, and an exit terminus 22 of the nozzle 24 is scarfed so that a first trailing edge portion 26 of the exit terminus 22 relatively distal to the center-of-gravity (CG) extends aftward of a second trailing edge portion 30 of the exit terminus 22 relatively proximal to the center-of-gravity (CG), relative to the central axis 16 of the final portion 10.1 of the nozzle 24. In accordance with one sub-aspect, illustrated inter alia in FIG. 2, the nozzle 24 is bent so that the central axis 16 of the final portion 10.1 of the nozzle 24 is oblique relative to a central axis 20 of the jet engine 12 upstream of the nozzle 24. In accordance with another sub-aspect, illustrated inter alia in FIGS. 2, 6a, 6b, 7a and 7b, the central axis 20 of the jet engine 12 upstream of the nozzle 24 is substantially aligned with either the central longitudinal axis 76 of the jet engine aircraft 40 or a nominal cruise flight path 60 of the jet engine aircraft 40. In accordance with yet another sub-aspect, illustrated inter alia in FIGS. 2 and 9, the exit terminus 22 comprises a concave profile. In accordance with yet another sub-aspect, illustrated inter alia in FIGS. 9, 10a and 10b, the exit terminus 22 comprises a convex profile. In accordance with yet another sub-aspect, illustrated inter alia in FIGS. 11a, 11b, 12a and 12b, the exit terminus 22 comprises an undercut profile. In accordance with yet another sub-aspect, illustrated inter alia in FIGS. 7a and 7b, the exit terminus 22 is substantially planar and oblique to the central axis 16 of the final portion 10.1 of the nozzle 24. In accordance with yet another sub-aspect, illustrated inter alia in FIGS. 6a, 6b, 8a and 8b, the jet engine 12 and the nozzle 24 are relatively fixed with respect to the jet engine aircraft 40. In accordance with yet another sub-aspect, illustrated inter alia in FIGS. 6a, 6b, 8a and 8b, the jet engine 12 depends from a vertical stabilizer of the jet engine aircraft 40.

In accordance with yet another aspect, a jet engine exhaust nozzle 24 comprises a relatively upstream duct portion 10.2 adapted to receive a stream of exhaust gas 46 generated by a jet engine 12, wherein a central axis 20 of the relatively upstream duct portion 10.2 is along a first direction 20; a bent duct portion 14, 14' downstream of the a relatively upstream duct portion 10.2; a final duct portion 10.1 downstream of the bent duct portion 14, 14', wherein a central axis 16 of the final duct portion 10.1 is along a second direction 16, the second direction 16 is oblique to the first direction 20, and the final duct portion 10.1 is bent in a third direction 18 relative to the relatively upstream duct portion 10.2 by the bent duct portion 14, 14'; and an exit terminus 22 of the final duct portion 10.1, wherein the exit terminus 22 is scarfed so that a first trailing edge portion 26 of the exit terminus 22 on a first side 28 of the final duct portion 10.1 extends aftward of a second trailing edge portion 30 of the exit terminus 22 on a second side 32 of the final duct portion 10.1, relative to the central axis 16 of the final duct portion 10.1 of the nozzle 24, the first 28 and second 32 sides are substantially opposite one another relative to the central axis 16 of the final duct portion 10.1, and the first side 28 of the final duct portion 10.1 is in the third direction 18 relative to the second side 32 of the final duct portion 10.1. In accordance with one sub-aspect, illustrated inter alia in FIGS. 2 and 9, the exit terminus 22 comprises a concave profile. In accordance with another sub-aspect, illustrated inter alia in FIGS. 9, 10a and 10b, the exit terminus 22 comprises a convex profile. In accordance with yet another sub-aspect, illustrated inter alia in FIGS. 11a, 11b, 12a and 12b, the exit terminus 22 comprises an undercut profile. In accordance with yet another sub-aspect, illustrated inter alia in FIGS. 7a and 7b, the exit terminus 22 is substantially planar and oblique to the central axis 16 of the final duct portion 10.1 of the nozzle 24.

In accordance with yet another aspect, a method of operating a jet engine 12 comprises directing a stream of exhaust gas 46 in a first direction 20; deflecting the stream of exhaust gas 46 so as to flow in a second direction 16, wherein the second direction 16 is deflected in a third direction 18 relative to the first direction 20; and ejecting the stream of exhaust gas 46 in a fourth direction 44, 44' from a nozzle 24 operatively coupled to or a part of the jet engine 12, wherein the fourth direction 44, 44' is relatively aligned with the second direction 16 when the jet engine 12 is operated in accordance with a first operating condition, the fourth direction 44, 44' is relatively oblique with respect to the second direction 16 in a direction opposite to the third direction 18 when the jet engine 12 is operated in accordance with a second operating condition, a nozzle pressure ratio (NPR) of the nozzle 24 at the first operating condition is less than the nozzle pressure ratio (NPR) of the nozzle 24 at the second operating condition, and a direction of the fourth direction 44, 44' responsive to the nozzle pressure ratio (NPR) of the nozzle 24 is automatically responsive to an interaction of the stream of exhaust gas 46 with the nozzle 24.

Referring to FIGS. 6a, 6b, 8a and 8b, in accordance with a first aspect of a jet engine aircraft 40, the jet engine 12 is mounted so as to be longitudinally offset with respect to the center-of-gravity (CG) of the jet engine aircraft 40 and transversely offset with respect to the associated central longitudinal axis 76, e.g. aft of the center-of-gravity (CG) and above the central longitudinal axis 76, so that a vector difference 78 between a first thrust vector 44 associated with a relatively low nozzle pressure ratio (NPR), and a second thrust vector 44' associated with a relatively high nozzle pressure ratio (NPR) has a component 78.1 that is directed normal to a pitch axis 80 of the jet engine aircraft 40.

Figure 14A:
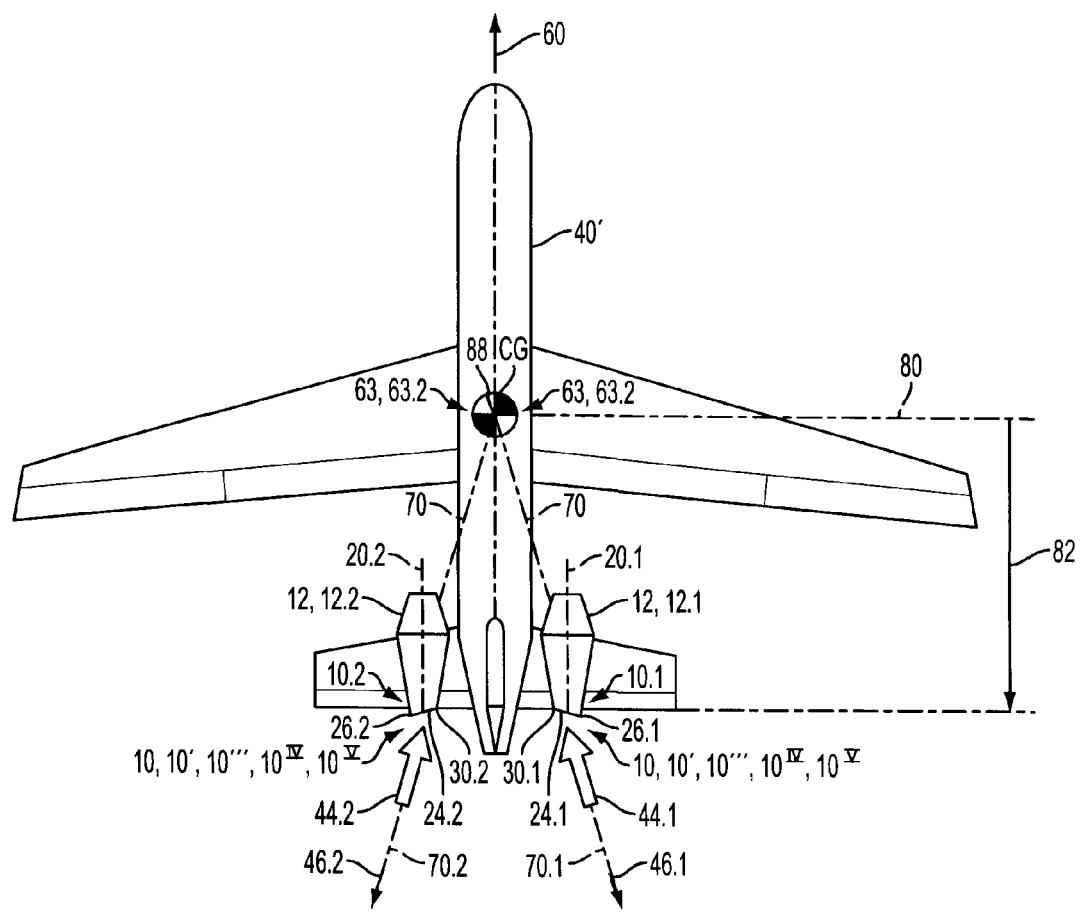
FIG. 14a illustrates a thrust vector in relation to a center of gravity of an aircraft incorporating a plurality of jet engines on different sides of the aircraft and providing for automatic pressure-ratio responsive yaw compensation, wherein the jet engine incorporates an exhaust duct and exhaust nozzle generally in accordance with any of FIG. 1, 2 or 9-12b during takeoff conditions.
Figure 14B:
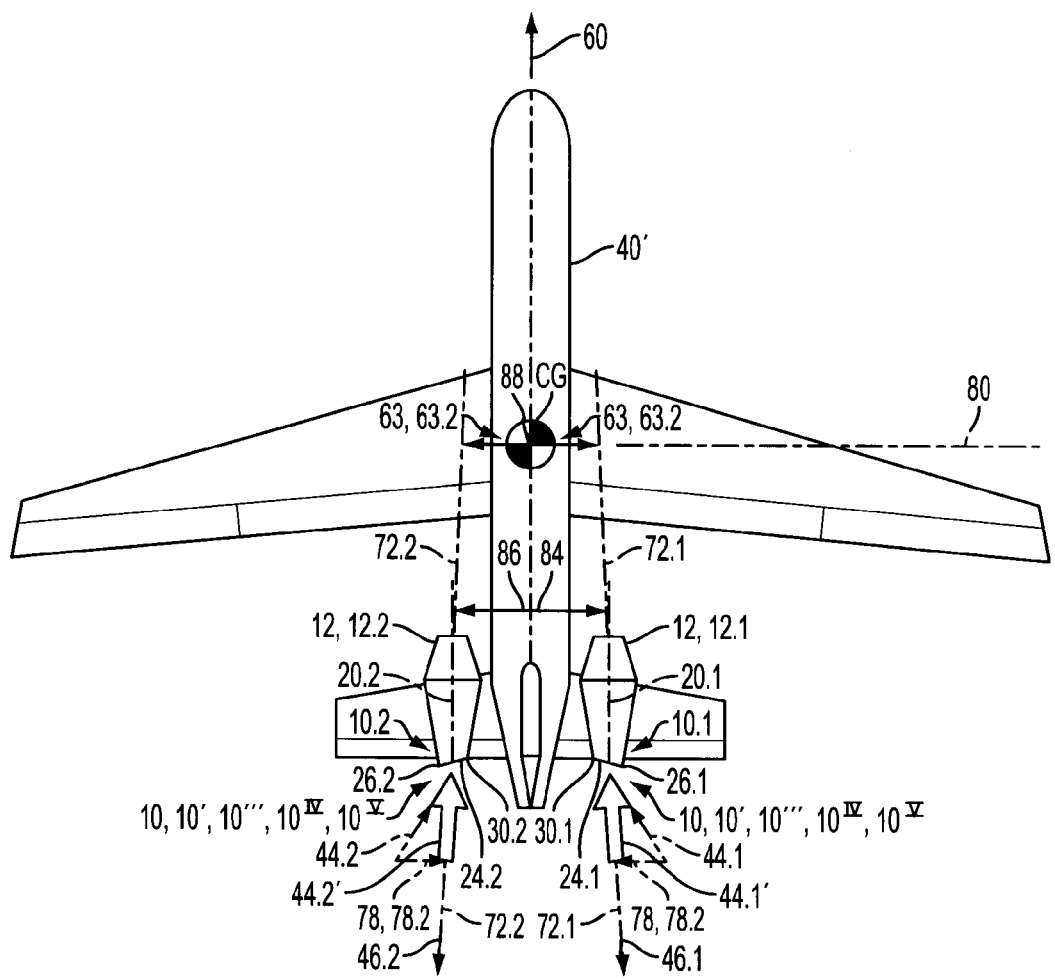
FIG. 14b illustrates the thrust vector in relation to a center of gravity of the aircraft and jet engine illustrated in FIG. 14a, but during relatively high-speed cruise conditions.

Referring to FIGS. 14a and 14b, in accordance with a second aspect a jet engine aircraft 40', the jet engine aircraft 40' incorporates a plurality of jet engines 12, for example, first 12.1 and second 12.2 jet engines, each at an aft location 82 with respect to the center-of-gravity (CG) and laterally offset from the central longitudinal axis 76 on first 84 and second 86 sides thereof, respectively.

The first jet engine 12.1 incorporates a first exhaust nozzle 24.1 having a first trailing edge portion 26.1 relatively outboard and relatively aft of a corresponding second trailing edge portion 30.1. Referring to FIG. 14a, when operated at a relatively low nozzle pressure ratio (NPR), —for example, during sea level (SL) take off, at relatively low power conditions, or relatively low aircraft speeds, —the first jet engine 12.1 provides for ejecting a first stream of exhaust gas 46.1 in a first direction 70.1 from an associated first nozzle 24.1 of an associated exhaust duct 10, 10', 10''', $10^{IV}$, $10^{V}$ operatively coupled to or a part of the first jet engine 12.1, wherein the associated first thrust vector 44.1 of the associated first stream of exhaust gas 46.1 is directed so as to act relatively close to the center-of-gravity (CG) of the aircraft 40, so as to reduce the associated yaw moment arm 63.2, so that in the event of catastrophic loss of power of the second jet engine 12.2 during take-off, the aircraft 40 would be less susceptible to a sudden left-yaw condition than would otherwise result absent the inwardly directed first thrust vector 44.1, thereby reducing the amount of rudder correction needed to maintain the direction of the flight path 60 of the aircraft 40, thereby reducing the work load of the pilot work load in the event of a failure of the second jet engine 12.2 during takeoff.

Referring to FIG. 14b, when operated at a relatively high nozzle pressure ratio (NPR), —for example, either at relatively high-speed cruise or relatively high power, —the first jet engine 12.1 provides for ejecting the first stream of exhaust gas 46.1 in a second direction 72.1 from the first nozzle 24.1 so that the resulting associated first thrust vector 44.1' acts relatively parallel to the path 60 of the aircraft 40, as provided by the relatively more leftwards deflection of the first stream of exhaust gas 46.1 because of the nature of the scarfed exhaust nozzle 24.1 at relatively high nozzle pressure ratios (NPR). This provides for improved fuel economy relative to the fuel economy that would result if the first stream of exhaust gas 46.1 was not so directed. Furthermore, by incorporating an associated exhaust duct 10, 10', 10''', $10^{IV}$, $10^{V}$ with the curvature of the exhaust duct 10 directed generally outwards, i.e. rightwards, and with the first trailing edge portion 26.1 located on the right side of the first jet engine 12.1, the first jet engine 12.1 can be oriented with the primary axis 20 thereof substantially parallel to the path 60 of the aircraft 40 during relatively high-speed cruise conditions so as provide for reduced associated aerodynamic drag, relative to an oblique orientation of the first jet engine 12.1, while also providing for the associated first thrust vector 44.1 therefrom to be directed leftwards so as to act relatively close to the center-of-gravity (CG) of the aircraft 40 during take-off conditions. Alternatively, the associated exhaust duct 10''' may be relatively straight, with the associated first jet engine 12.1 rotated counter-clockwise when viewed from the top of the aircraft 40 so that, —as for a first jet engine 12.1 with a curved exhaust duct 10, 10', 10''', $10^{IV}$, $10^{V}$, —when operated at a relatively low nozzle pressure ratio (NPR), the associated resulting first thrust vector 44.1 has a relatively smaller moment arm 63.2 relative to the center-of-gravity (CG) of the aircraft 40 relative to when operated at a relatively high nozzle pressure ratio (NPR), and when operated at a relatively high nozzle pressure ratio (NPR), the associated resulting first thrust vector 44.1' is relatively parallel to the path 60 of the aircraft 40 relative to when operated at a relatively low nozzle pressure ratio (NPR).

Similarly, the second jet engine 12.2 incorporates a second exhaust nozzle 24.2 having a first trailing edge portion 26.2 relatively outboard and relatively aft of a corresponding second trailing edge portion 30.2. Referring to FIG. 14*a*, when operated at a relatively low nozzle pressure ratio (NPR), —for example, during sea level (SL) take off, at relatively low power conditions, or relatively low aircraft speeds, —the second jet engine 12.2 provides for ejecting a second stream of exhaust gas 46.2 in a third direction 70.2 from an associated second nozzle 24.2 of an associated exhaust duct 10, 10', 10''', 10$^{IV}$, 10$^V$ operatively coupled to or a part of the second jet engine 12.2, wherein the associated third thrust vector 44.2 of the associated second stream of exhaust gas 46.2 is directed so as to act relatively close to the center-of-gravity (CG) of the aircraft 40, so as to reduce the associated yaw moment arm 63.2, so that in the event of catastrophic loss of power of the second jet engine 12.2 during take-off, the aircraft 40 would be less susceptible to a sudden right-yaw condition than would otherwise result absent the inwardly directed third thrust vector 44.2, thereby reducing the amount of rudder correction needed to maintain the direction of the flight path 60 of the aircraft 40, thereby reducing the work load of the pilot work load in the event of a failure of the first jet engine 12.1 during takeoff.

Referring to FIG. 14*b*, when operated at a relatively high nozzle pressure ratio (NPR), —for example, either at relatively high-speed cruise or relatively high power, —the second jet engine 12.2 provides for ejecting the second stream of exhaust gas 46.2 in a fourth direction 72.2 from the second nozzle 24.2 so that the resulting associated fourth thrust vector 44.2' acts relatively parallel to the path 60 of the aircraft 40, as provided by the relatively more rightwards deflection of the second stream of exhaust gas 46.2 because of the nature of the scarfed exhaust nozzle 24.1 at relatively high nozzle pressure ratios (NPR). This provides for improved fuel economy relative to the fuel economy that would result if the second stream of exhaust gas 46.2 was not so directed. Furthermore, by incorporating an associated exhaust duct 10, 10', 10''', 10$^{IV}$, 10$^V$ with the curvature of the exhaust duct 10 directed generally outwards, i.e. leftwards, and with the first trailing edge portion 26.2 located on the left side of the second jet engine 12.2, the second jet engine 12.2 can be oriented with the primary axis 20 thereof substantially parallel to the path 60 of the aircraft 40 during relatively high-speed cruise conditions so as provide for reduced associated aerodynamic drag, relative to an oblique orientation of the second jet engine 12.2, while also providing for the associated third thrust vector 44.2 therefrom to be directed rightwards so as to act relatively close to the center-of-gravity (CG) of the aircraft 40 during take-off conditions. Alternatively, the associated exhaust duct 10" may be relatively straight, with the associated second jet engine 12.2 rotated clockwise when viewed from the top of the aircraft 40 so that, —as for a second jet engine 12.2 with a curved exhaust duct 10, 10', 10''', 10$^{IV}$, 10$^V$, —when operated at a relatively low nozzle pressure ratio (NPR), the associated resulting third thrust vector 44.2 has a relatively smaller moment arm 63.2 relative to the center-of-gravity (CG) of the aircraft 40 relative to when operated at a relatively high nozzle pressure ratio (NPR), and when operated at a relatively high nozzle pressure ratio (NPR), the associated resulting fourth thrust vector 44.2' is relatively parallel to the path 60 of the aircraft 40 relative to when operated at a relatively low nozzle pressure ratio (NPR).

Accordingly, in accordance with the aspect of a jet engine aircraft 40, first 12.1 and second 12.2 jet engines are mounted so as to be longitudinally offset with respect to the center-of-gravity (CG) of the jet engine aircraft 40 and transversely offset with respect to the associated central longitudinal axis 76, e.g. both aft of the center-of-gravity (CG) and respectively right and left of the central longitudinal axis 76, so that a vector differences 78 between the associated respective first 44.1 and third 44.2 thrust vectors associated with a relatively low nozzle pressure ratio (NPR), and corresponding respective second 44.1' and third 44.2' thrust vectors associated with a relatively high nozzle pressure ratio (NPR) have corresponding component 78.2 that are each directed normal to a yaw axis 88 of the jet engine aircraft 40.

Figure 15:
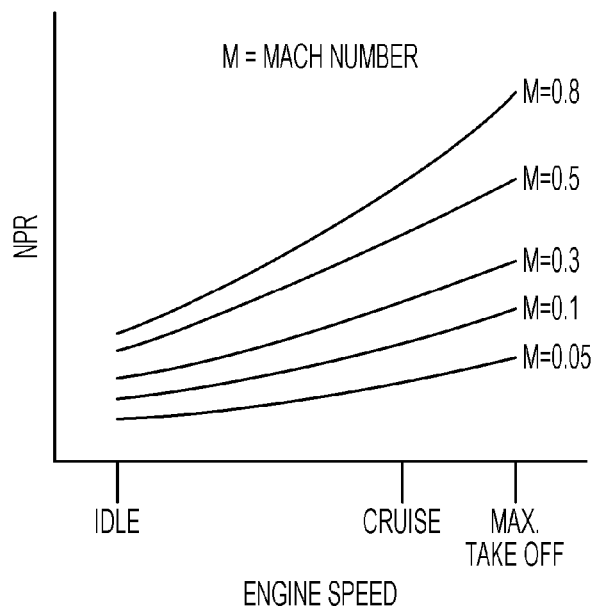
FIG. 15 illustrates a plot of nozzle pressure ratio as a function of jet engine speed for a variety of associated aircraft Mach numbers.

Referring to FIG. 15, the nozzle pressure ratio (NPR) of a jet engine 12, 12.1, 12.2 is relatively low at all associated engine speeds under takeoff conditions, i.e. at low Mach numbers. Under these conditions, the exhaust duct 10, 10', 10", 10''', 10$^{IV}$, 10$^{IV}$ associated exhaust nozzle 24, 24', 24", 24''', 24$^{IV}$, 24$^V$, 24.1, 24.2 provide for the associated thrust vectors 44.1, 44.2 from the associated first 46.1 and second 46.2 exhaust streams to have a relatively low associated moment arm 63, 63.2 so as to provide for a relatively lower yaw moment in the event of a failure of one of the jet engines 12.1, 12.2 during takeoff, which may provide for using a smaller rudder 90 and/or associated trim tab surfaces, and which provides for reducing pilot workload responsive to such a failure. For example, if the absolute physical size of the rudder 90 was in fact governed by the requirement for yaw control responsive to an engine-out scenario, then a plurality of exhaust ducts 10, 10', 10", 10''', 10$^{IV}$, 10$^V$ and associated exhaust nozzles 24, 24', 24", 24''', 24$^{IV}$, 24$^V$, 24.1, 24.2 would provide for reducing the absolute physical size of the rudder 90 to a level either sufficient to either provide yaw control responsive to an engine-out scenario or to satisfy some other rudder-associated requirement.

Figure 16:
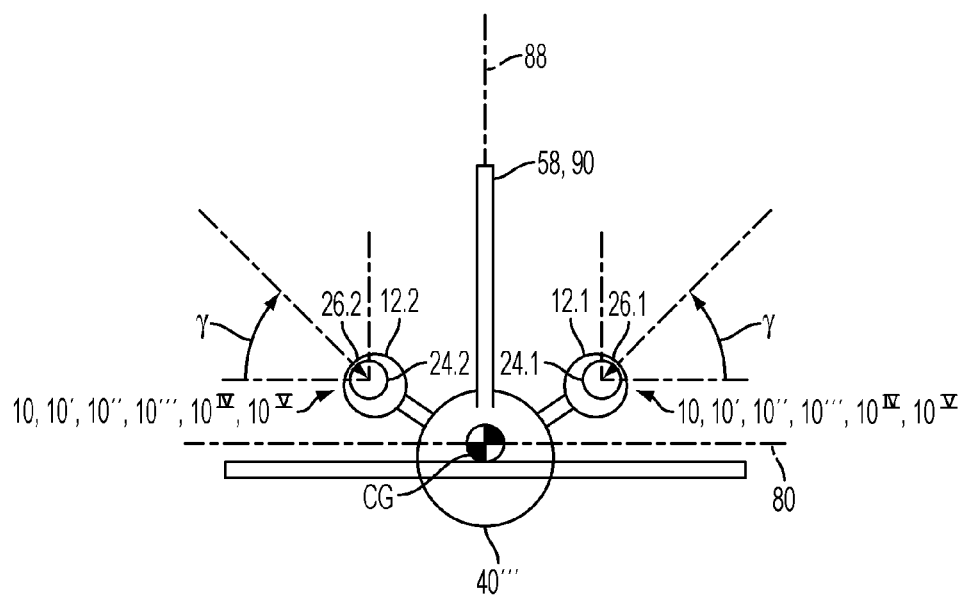
FIG. 16 illustrates a tail-end view of a twin-engine jet aircraft with the associated jet engines mounted on either side of the aircraft aft of the aircraft center-of-gravity, illustrating a range of associated exhaust duct and exhaust nozzle orientations providing for a corresponding range of automatic pressure-ratio responsive compensation ranging from automatic pressure-ratio responsive pitch compensation to automatic pressure-ratio responsive yaw compensation, including a combination thereof.

Referring to FIG. 16, a third aspect of a jet engine aircraft 40" is a combination of the first and second aspects, wherein the associated exhaust ducts 10, 10', 10", 10''', 10$^{IV}$, 10$^V$ and associated exhaust nozzles 24, 24', 24", 24''', 24$^{IV}$, 24$^V$, 24.1, 24.2 of each of the associated jet engines 12.1, 12.2 are oriented so that, for both jet engines 12.1, 12.2 located above and behind the center-of-gravity (CG) of the aircraft 40, the associated first trailing edge portion 26.1 and first thrust vector 44.1 associated with the first jet engine 12.1 is rotated about the center-of-gravity (CG) of the aircraft 40 by an angle +γ from the pitch axis 80, and the associated first trailing edge portion 26.2 and third thrust vector 44.2 associated with the second jet engine 12.2 is rotated about the center-of-gravity (CG) of the aircraft 40 by an angle −γ from the pitch axis 80, for γ between 0 and 90 degrees, so as to provide for a combination of automatic pressure-ratio responsive pitch compensation and automatic pressure-ratio responsive yaw compensation, for example, the combination of which is generally illustrated in FIGS. 7*a* and 7*b*, each of which components are described more fully hereinabove in conjunction with each of the separately described first and second aspects of the jet engine aircraft 40, 40'. For example, for γ=0, the third aspect of the jet engine aircraft 40" acts in accordance with the second aspect of the jet engine aircraft 40', for γ=90 degrees, the third aspect of the jet engine aircraft 40" acts in accordance with the first aspect of the jet engine aircraft 40, and otherwise third aspect of the jet engine aircraft 40" acts in accordance with both the first and second aspects of the jet engine aircraft 40, 40'. For example, in one embodiment, the first and second jet engines 12.1, 12.2 are each oriented so that the associated first 44.1 and third 44.2 thrust vectors are each aligned with, i.e. intersect, the central longitudinal axis 76 of the aircraft 40".

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth the appended claims, and any and all equivalents thereof.

The invention claimed is:

1. A jet engine exhaust nozzle, comprising:
   a. a relatively upstream duct portion adapted to receive a stream of exhaust gas generated by a jet engine, wherein a central axis of said relatively upstream duct portion is along a first direction;
   b. a bent duct portion downstream of said relatively upstream duct portion;
   c. a final duct portion downstream of said bent duct portion, wherein a central axis of said final duct portion is along a second direction, said second direction is oblique to said first direction, and said final duct portion is bent in a third direction relative to said relatively upstream duct portion by said bent duct portion; and
   d. an exit terminus of said final duct portion, wherein said exit terminus is scarfed so that a first trailing edge portion of said exit terminus on a first side of said final duct portion extends aftward of a second trailing edge portion of said exit terminus on a second side of said final duct portion, relative to said central axis of said final duct portion of said jet engine exhaust nozzle, said first and second sides are substantially opposite one another relative to said central axis of said final duct portion, and said first side of said final duct portion is in said third direction relative to said second side of said final duct portion, wherein in operation, said exhaust gas is discharged from said exit terminus in a fourth direction, said final duct portion in cooperation with said exit terminus provides for said fourth direction to be relatively aligned with said second direction when said jet engine exhaust nozzle is operated at a first nozzle pressure ratio, and said final duct portion in cooperation with said exit terminus provides for said fourth direction to be relatively oblique with respect to said second direction in a direction opposite to said third direction when said jet engine exhaust nozzle is operated at a second pressure ratio, said first nozzle pressure ratio is less than said second nozzle pressure ratio, and a direction of said fourth direction responsive to said nozzle pressure ratio of said jet engine exhaust nozzle is inherently passively responsive to an interaction of said stream of exhaust gas with said jet engine exhaust nozzle, independent of any moving parts.

2. A jet engine exhaust nozzle as recited in claim 1, wherein said exit terminus comprises a concave profile.

3. A jet engine exhaust nozzle as recited in claim 1, wherein said exit terminus is substantially planar and oblique to said central axis of said final duct portion of said jet engine exhaust nozzle.

4. A method of operating a jet engine incorporating the jet engine exhaust nozzle set forth in claim 1, comprising:
   a. directing a stream of exhaust gas in a first direction;
   b. deflecting said stream of exhaust gas so as to flow in a second direction, wherein said second direction is deflected in a third direction relative to said first direction; and
   c. ejecting said stream of exhaust gas in a fourth direction from said jet en sine exhaust nozzle operatively coupled to or a part of said jet engine, wherein said fourth direction is relatively aligned with said second direction when said jet engine is operated in accordance with a first operating condition, said fourth direction is relatively oblique with respect to said second direction in a direction opposite to said third direction when said jet engine is operated in accordance with a second operating condition, a nozzle pressure ratio of said jet engine exhaust nozzle at said first operating condition is less than said nozzle pressure ratio of said jet engine exhaust nozzle at said second operating condition, and a direction of said fourth direction responsive to said nozzle pressure ratio of said jet engine exhaust nozzle is inherently passively responsive to an interaction of said stream of exhaust gas with said jet engine exhaust nozzle, independent of any moving parts.

5. A jet engine exhaust nozzle, comprising:
   a. a relatively upstream duct portion adapted to receive a stream of exhaust gas generated by a jet engine, wherein a central axis of said relatively upstream duct portion is along a first direction;
   b. a bent duct portion downstream of said relatively upstream duct portion;
   c. a final duct portion downstream of said bent duct portion, wherein a central axis of said final duct portion is along a second direction, said second direction is oblique to said first direction, and said final duct portion is bent in a third direction relative to said relatively upstream duct portion by said bent duct portion; and
   d. an exit terminus of said final duct portion, wherein said exit terminus is scarfed so that a first trailing edge portion of said exit terminus on a first side of said final duct portion extends aftward of a second trailing edge portion of said exit terminus on a second side of said final duct portion, relative to said central axis of said final duct portion of said jet engine exhaust nozzle, said first and second sides are substantially opposite one another relative to said central axis of said final duct portion, and said first side of said final duct portion is in said third direction relative to said second side of said final duct portion, wherein said exit terminus comprises a convex profile.

6. A jet engine exhaust nozzle, comprising:
   a. a relatively upstream duct portion adapted to receive a stream of exhaust gas generated by a jet engine, wherein a central axis of said relatively upstream duct portion is along a first direction;
   b. a bent duct portion downstream of said relatively upstream duct portion;
   c. a final duct portion downstream of said bent duct portion, wherein a central axis of said final duct portion is along a second direction, said second direction is oblique to said first direction, and said final duct portion is bent in a third direction relative to said relatively upstream duct portion by said bent duct portion; and
   d. an exit terminus of said final duct portion, wherein said exit terminus is scarfed so that a first trailing edge portion of said exit terminus on a first side of said final duct portion extends aftward of a second trailing edge portion of said exit terminus on a second side of said final duct portion, relative to said central axis of said final duct portion of said jet engine exhaust nozzle, said first and second sides are substantially opposite one another relative to said central axis of said final duct portion, and said first side of said final duct portion is in said third direction relative to said second side of said final duct portion, wherein said exit terminus comprises an undercut profile.

* * * * *

UNITED STATES PATENT AND TRADEMARK OFFICE
CERTIFICATE OF CORRECTION

| | |
|---|---|
| PATENT NO. | : 8,746,613 B2 |
| APPLICATION NO. | : 12/544830 |
| DATED | : June 10, 2014 |
| INVENTOR(S) | : Mark E. Suchezky and Lisa M. Simpkins |

Page 1 of 1

It is certified that error appears in the above-identified patent and that said Letters Patent is hereby corrected as shown below:

Specification

Column 7, Line 20, "exhaust nozzle 24''''" should be changed to --exhaust nozzle 24'''--.

Column 12, Line 13, "$10^{IV}, 10^{IV}$" should be changed to --$10^{IV}, 10^{V}$--.

Claims

Column 13, Line 64, Claim 4, "jet en sine" should be changed to --jet engine--.

Signed and Sealed this
Tenth Day of November, 2015

Michelle K. Lee
*Director of the United States Patent and Trademark Office*